United States Patent
Nagato et al.

(10) Patent No.: US 10,303,447 B2
(45) Date of Patent: May 28, 2019

(54) PROGRAM GENERATING APPARATUS AND METHOD THEREFOR

(71) Applicant: FUJITSU LIMITED, Kawasaki-shi, Kanagawa (JP)

(72) Inventors: Tsuyoshi Nagato, Isehara (JP); Tetsuo Koezuka, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 90 days.

(21) Appl. No.: 15/364,941

(22) Filed: Nov. 30, 2016

(65) Prior Publication Data

US 2017/0083295 A1 Mar. 23, 2017

Related U.S. Application Data

(63) Continuation of application No. PCT/JP2014/066278, filed on Jun. 19, 2014.

(51) Int. Cl.
*G06F 9/44* (2018.01)
*G06K 9/62* (2006.01)
(Continued)

(52) U.S. Cl.
CPC .......... *G06F 8/36* (2013.01); *G06F 9/44* (2013.01); *G06K 9/6229* (2013.01); *G06N 3/00* (2013.01);
(Continued)

(58) Field of Classification Search
CPC .......... G06F 8/36; G06F 9/44; G06K 9/6229; G06K 9/4628; G06N 3/00; G06N 99/005; G06T 1/0007; G06T 5/00
See application file for complete search history.

(56) References Cited

U.S. PATENT DOCUMENTS

2004/0039716 A1* 2/2004 Thompson ............... G06F 8/36
706/13
2005/0183073 A1* 8/2005 Reynolds ................. G06F 8/30
717/141
(Continued)

FOREIGN PATENT DOCUMENTS

JP 11-282822 10/1999
JP 2006-285385 10/2006
(Continued)

OTHER PUBLICATIONS

Japanese Platform for Patent Information, Publication No. 2009-151371, published Jul. 9, 2009.
(Continued)

*Primary Examiner* — Ziaul A Chowdhury
(74) *Attorney, Agent, or Firm* — Staas & Halsey LLP

(57) ABSTRACT

A setting unit sets a selection probability for each of a plurality of parameter values selectively configurable in a parameter-variable program amongst a plurality of partial programs, based on a relationship between the parameter values and an amount of characteristic obtained from at least an input image included in learning data. When having selected the parameter-variable program as a partial program to be newly assigned to a target position for a mutation in order to evolve an individual by introducing the mutation, a selection processing unit selects, amongst the parameter values, one parameter value according to the selection probabilities respectively associated with the parameter values, and incorporates the parameter-variable program with the selected parameter value set therein into the individual.

7 Claims, 29 Drawing Sheets

(51) Int. Cl.
*G06N 20/00* (2019.01)
*G06T 5/00* (2006.01)
*G06F 8/36* (2018.01)
*G06N 3/00* (2006.01)
*G06T 1/00* (2006.01)
*G06K 9/46* (2006.01)

(52) U.S. Cl.
CPC ........... *G06N 20/00* (2019.01); *G06T 1/0007* (2013.01); *G06T 5/00* (2013.01); *G06K 9/4628* (2013.01)

(56) References Cited

U.S. PATENT DOCUMENTS

| | | | | |
|---|---|---|---|---|
| 2007/0100784 | A1* | 5/2007 | Arthur | G06F 8/36 |
| 2008/0069399 | A1* | 3/2008 | Nagao | G06T 7/215 |
| | | | | 382/103 |
| 2010/0049340 | A1* | 2/2010 | Smits | G05B 13/026 |
| | | | | 700/31 |
| 2010/0179930 | A1* | 7/2010 | Teller | G06N 20/00 |
| | | | | 706/12 |
| 2010/0278425 | A1* | 11/2010 | Takemoto | G06T 7/10 |
| | | | | 382/173 |
| 2014/0092805 | A1* | 4/2014 | van de Ven | G06N 3/126 |
| | | | | 370/328 |
| 2014/0104450 | A1 | 4/2014 | Cox | |
| 2016/0098615 | A1* | 4/2016 | Nagato | G06N 3/126 |
| | | | | 382/141 |
| 2016/0246576 | A1* | 8/2016 | Cory | G06F 8/36 |

FOREIGN PATENT DOCUMENTS

| | | |
|---|---|---|
| JP | 2007-200246 | 8/2007 |
| JP | 2009-151371 | 7/2009 |
| JP | 2010-244363 | 10/2010 |

OTHER PUBLICATIONS

Japanese Platform for Patent Information, Publication No. 2006-285385, published Oct. 19, 2006.
Japanese Platform for Patent Information, Publication No. 2010-244363, published Oct. 28, 2010.
Japanese Platform for Patent Information, Publication No. 11-282822, published Oct. 15, 1999.
Chunlei et al., "An Adaptive Mutation Method for GA Based on Relative Importance", 2010 3rd International Conference on Advanced Computer Theory and Engineering (ICACTE), vol. 5, 2010.08.22, pp. 111-113.
Aoki et al., "ACTIT: Automatic Construction of Tree-structural Image Transformations", The Institute of Image Information and Television Engineers, vol. 53, No. 6, Jun. 20, 1999, pp. 888-894.
International Search Report dated Sep. 9, 2014 in corresponding International Application No. PCT/JP2014/066278.
Written Opinion of the International Search Authority dated Sep. 9, 2014 in corresponding International Application No. PCT/JP2014/066278.
Japanese Office Action dated Jan. 30, 2018 in Japanese Patent Application No. 2016-528725.
English Abstract for Japanese Patent Application Publication No. 2007-200246, published Aug. 9, 2007.
Fujishima et al., "PT-ACTIT; Parameter Tunable-Automatic Construction of Tree-structural Image Transformation," IEICE Technical Report, Image Engineering, vol. 103, No. 539, Jan. 5, 2004, pp. 19-23.
Aoki et al., "Automatic Construction of Tree-Structural Image Transformation Using Genetic Programming," Image Processing, vol. 1, Oct. 24, 1999, pp. 529-533.
Extended European Search Report for European Patent Application No. 14895179.1, dated May 24, 2017.
European Office Action dated Jan. 29, 2019 in corresponding European Patent Application No. 14895179.1.
Chinese Office Action dated Jan. 25, 2019 in corresponding Chinese Patent Application No. 201480080009.6.

* cited by examiner

301

| GROUP | FILTER NAME | PARAMETER |
|---|---|---|
| FREQUENCY PROCESSING | LOW-PASS FILTER #1 | d1 |
| | LOW-PASS FILTER #2 | d2 |
| | ... | ... |
| | HIGH-PASS FILTER #1 | d11 |
| | ... | ... |
| THRESHOLD PROCESSING | THRESHOLD FILTER #1 | th1 |
| | ... | ... |
| | THRESHOLD FILTER #5 | th5 |
| DIFFERENTIAL PROCESSING | SOBEL FILTER #1 | x1, y1 |
| | SOBEL FILTER #2 | x1, y2 |
| | ... | ... |
| | LAPLACE FILTER #1 | d21 |
| | ... | ... |
| | PREWITT FILTER #1 | x11, y11 |
| | ... | ... |
| ... | ... | ... |

PROGRAM GENERATING APPARATUS AND METHOD THEREFOR

CROSS-REFERENCE TO RELATED APPLICATION

This application is a continuation application of International Application PCT/JP2014/066278 filed on Jun. 19, 2014 which designated the U.S., the entire contents of which are incorporated herein by reference.

FIELD

The embodiments discussed herein are related to a program generating apparatus and program generating method.

BACKGROUND

A technology to automatically generate, by genetic programming, an image processing program for performing desired image processing has gained attention. By means of genetic programming, this technology incrementally optimizes an image processing program formed by a combination of partial programs for image processing (for example, image filter programs), using input images and images to be obtained as a result of processing (target images).

As an example of apparatuses using genetic programming, there is a proposed image processing apparatus that generates an image processing procedure for producing desired processing results once the user designates a partial region in a processing image and also creates a target image in which image processing desired by the user has been performed on the designated region.

Japanese Laid-open Patent Publication No. 2009-151371

Shinya Aoki and Tomoharu Nagao, "ACTIT: Automatic construction of tree-structural image transformations", The Journal of the Institute of Image Information and Television Engineers, Vol. 53, No. 6, 20 Jun. 1999, pp. 888-894

What remains an issue for the process of automatically generating an image processing program by genetic programming is that the program generating process takes a long time. For example, the above-described process is likely to achieve high-quality image processing closer to targeted processing when a larger number of selectable partial programs are prepared in advance. On the other hand, however, it also raises the possibility of taking a long time until a combination of appropriate partial programs is found.

SUMMARY

According to one aspect, there is provided a program generating apparatus including: a memory configured to store learning data including an input image and a target image corresponding to the input image; and a processor configured to perform a procedure including: setting selection probabilities respectively for a plurality of parameter values selectively configurable in a parameter-variable program amongst a plurality of partial programs, based on a relationship between the parameter values and an amount of characteristic obtained from at least the input image included in the learning data; and generating an image processing program by determining a combination of partial programs selected from the plurality of partial programs, by means of genetic programming using the learning data, wherein the generating includes selecting, amongst the parameter values, one parameter value according to the selection probabilities respectively associated with the parameter values and incorporating the parameter-variable program with the selected parameter value set therein into an individual formed by combining two or more partial programs selected from the plurality of partial programs when having selected the parameter-variable program as a partial program to be newly incorporated into the individual at a target position for a mutation in order to evolve the individual by introducing the mutation.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 23 illustrates an example of grouped image filters;

DESCRIPTION OF EMBODIMENTS

Figure 1:
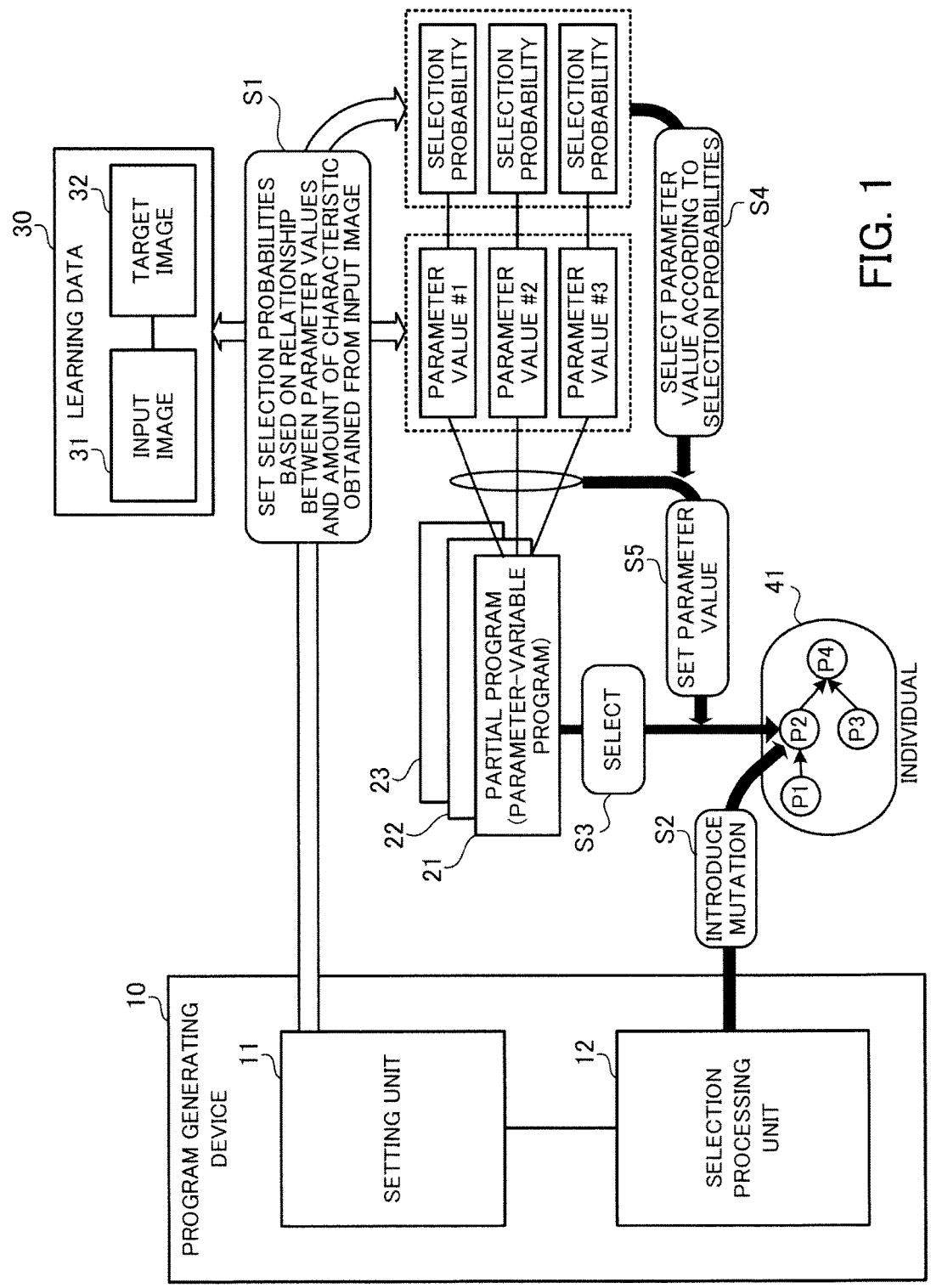
FIG. 1 illustrates configuration and process examples of a program generating device according to an embodiment 1-1.

Several embodiments will be described below with reference to the accompanying drawings. In the following description and the accompanying drawings, like reference numerals refer to like elements having substantially the same functions, and a repeated description thereof may be omitted.

1. Embodiment 1-1

FIG. 1 illustrates configuration and process examples of a program generating device according to an embodiment 1-1. A program generating device 10 generates an image processing program using genetic programming.

A storage device (not illustrated) of the program generating device 10 stores in advance a plurality of partial programs 21, 22, 23, and the like, each of which is designed to perform an image process. The partial programs are, for example, image filters. The image processing program generated by the program generating device 10 is implemented by combining a plurality of partial programs selected amongst the pre-stored partial programs 21, 22, 23, and the like. By means of genetic programming using learning data 30, the program generating device 10 determines an optimum combination of partial programs to be included in the image processing program.

The learning data 30 includes a pair of an input image 31 and a target image 32 which is obtained by performing targeted image processing on the input image 31. The learning data 30 is also stored in the storage device (not illustrated) of the program generating device 10. According to FIG. 1, one pair of the input image 31 and the target image 32 is used; however, a plurality of pairs of such images may be used instead.

At least one of the pre-stored partial programs 21, 22, 23, and the like, allows a parameter to be set therein. Assume in FIG. 1 that the partial program 21 is a "parameter-variable program" whose parameter is configurable. Parameter values configurable in a parameter-variable program are prepared in advance as discrete values, and one selected from among the prepared parameter values is set in the parameter-variable program. According to the example of FIG. 1, parameter values #1, #2, and #3 are configurable in the partial program 21.

The program generating device 10 includes a setting unit 11 and a selection processing unit 12. Processes performed by the setting unit 11 and the selection processing unit 12 are implemented, for example, by a processor (not illustrated) of the program generating device 10 executing a predetermined program.

The setting unit 11 sets the selection probabilities each associated with one of the parameter values selectively configurable in the parameter-variable program (i.e., the partial program 21). The setting unit 11 determines the selection probability for each of the configurable parameter values based on the relationship between the parameter values and the amount of characteristic obtained from at least the input image 31 amongst information included in the learning data 30 (step S1). Note that the amount of characteristic may be calculated based on the input image 31 and its corresponding target image 32.

According to the setting process of the setting unit 11, a higher selection probability is set for a parameter value when a process implemented by the parameter-variable program with the parameter value set therein provides higher effectiveness. Providing higher effectiveness means that processing details implemented by the parameter-variable program with the parameter value set therein are closer to targeted processing details, and the parameter value therefore makes a higher contribution to learning. That is, the parameter-variable program with the highly effective parameter value set therein is incorporated into an individual in the learning process, which raises the possibility of a better fitness score being calculated for the individual. This promotes fitness scores to converge to a high value and thus facilitates the learning.

During the learning process in genetic programming, the selection processing unit 12 selects, amongst the partial programs 21, 22, 23, and the like, a partial program to be assigned to a node of an individual. The individual is generated by combining a plurality of partial programs selected from the partial programs 21, 22, 23, and the like. The individual has, for example, a tree structure, and one partial program is assigned to each node of the tree structure.

In the case of having selected a parameter-variable program as a partial program to be assigned to a node of an individual, the selection processing unit 12 selects a parameter value to be set in the selected parameter-variable program according to the selection probabilities respectively associated with configurable parameter values. Then, the selection processing unit 12 sets the selected parameter value in the parameter-variable program and assigns the parameter-variable program with the parameter value set therein to the appropriate node.

Selecting a parameter value to be set in the parameter-variable program according to the associated selection probabilities makes a parameter value estimated to provide higher effectiveness for image processing using the learning data 30 more likely to be set in the parameter-variable program. This promotes generation of individuals with high fitness scores and therefore facilitates the learning. As a result, the time needed to generate an image processing program is likely to be reduced.

The case where a partial program is assigned to a node of an individual is, for example, when a new partial program is assigned to a mutation target node of an individual in place of a partial program having been assigned thereto, in order to introduce a mutation into the individual. Next, the case is described, as an example, where a mutation is applied to a partial program P2 amongst partial programs P1 to P4 included in an individual 41 of FIG. 1 (step S2), to thereby evolve the individual 41.

The selection processing unit 12 selects, for example, randomly a partial program to be incorporated into the individual 41 amongst the partial programs 21, 22, 23, and the like in place of the partial program P2. Assume here that the selection processing unit 12 selects the partial program 21, which is a parameter-variable program, as a partial program to be incorporated into the individual 41 (step S3). The selection processing unit 12 selects, amongst the parameter values #1 to #3 configurable in the partial program 21, one parameter value according to the selection probabilities respectively associated with the parameter values #1 to #3 (step S4). The selection processing unit 12 sets the selected parameter value in the partial program 21, and incorporates the partial program 21 with the parameter value set therein into the individual 41, in place of the partial program P2 (step S5).

According to the above-described process of the selection processing unit 12, a parameter value estimated to provide higher effectiveness for image processing using the learning data 30 is more likely to be set in the parameter-variable program. This assists the progress of the learning and therefore raises the possibility of reducing the time needed to generate an image processing program.

Note that, preparing a larger number of parameter values configurable in a parameter-variable program raises the possibility of generating a program of high-quality image processing closer to targeted processing; however, it also raises the possibility for the image processing program generating process to take a long time. According to the process of the selection processing unit 12, even when the number of parameter values configurable in a parameter-variable program is increased, an effective parameter value is likely to be actually selected from them and set in the parameter-variable program. This reduces the possibility of an increase in the time needed for the program generating process, which in turn raises the possibility of generating a high-quality image processing program in a short amount of time.

Another case where a partial program is assigned to a node of an individual is when, in order to generate an initial individual, a partial program selected from the partial programs 21, 22, 23, and the like, is assigned to each of nodes of the initial individual. In this case also, the selection processing unit 12 is able to select a partial program to be assigned to each node in the same manner as in steps S3 to S5 above. As is the case in introducing a mutation described above, the learning is likely to be facilitated, which is then likely to reduce the time needed to generate an image processing program.

2. Embodiment 1-2

Next described is an image processing device according to an embodiment 1-2. The image processing device of the embodiment 1-2 has the same processing functions as those of the program generating device 10 of FIG. 1 as well as functions for running an image processing program generated by the processing functions to thereby perform image processing.

The following first describes, referring to FIGS. 2 to 4, a reference example representing a basic procedure for an image processing program generating process using genetic programming, and subsequently describes an image processing device according to the embodiment 1-2.

Figure 2:
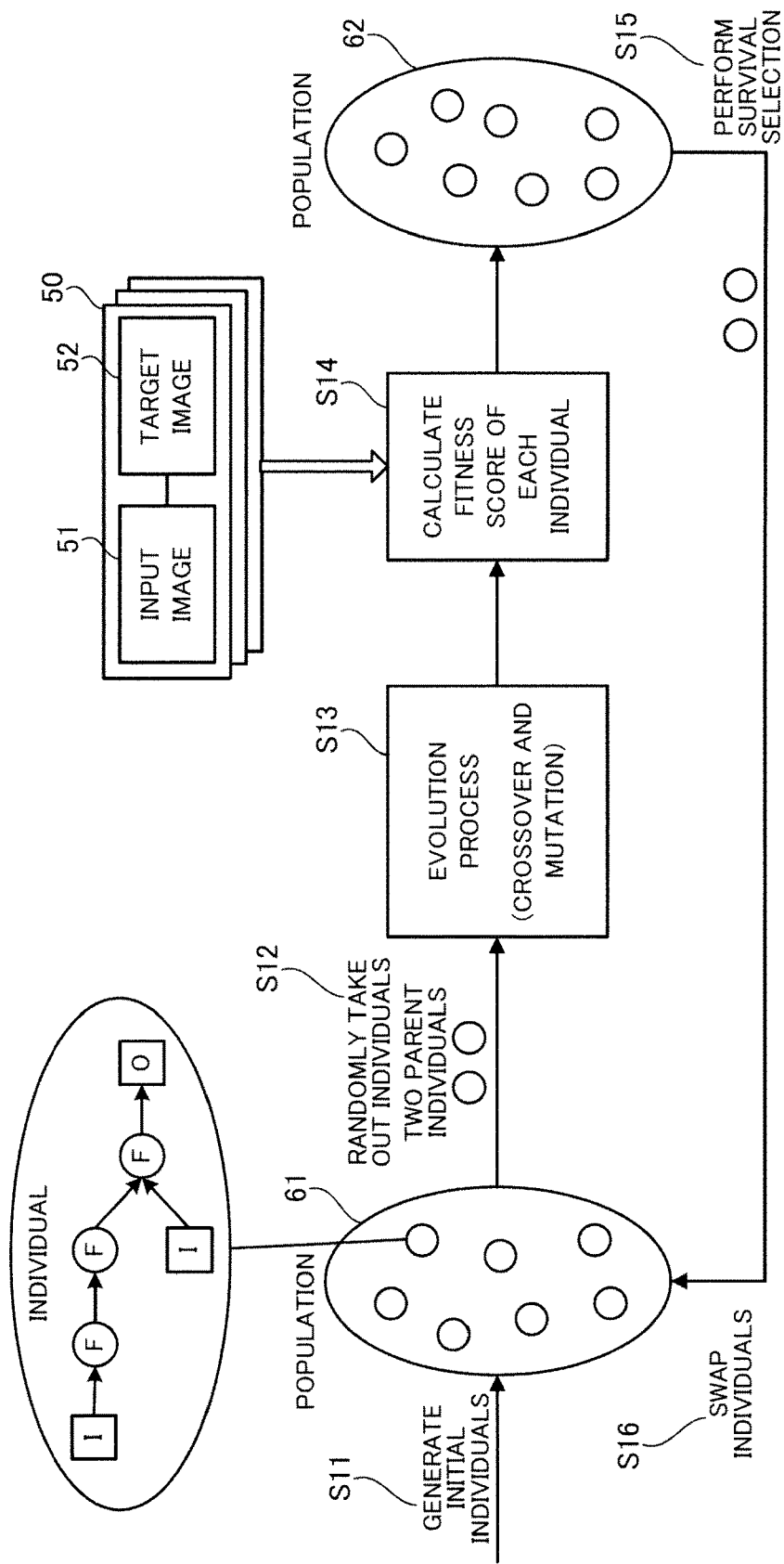
FIG. 2 illustrates a reference example of a procedure for an image processing program generating process.

FIG. 2 illustrates the reference example of the procedure for the image processing program generating process.

Prior to the image processing program generating process, one or more sets of learning data 50 are prepared. Each set of the learning data 50 includes an input image 51 and a target image 52 obtained by performing image processing on the input image 51. The input image 51 is obtained by, for example, taking an image of a subject with a camera.

In the image processing program generating process using genetic programming, each individual is formed by combining one or more partial programs. Each individual is defined, for example, by a tree structure, as illustrated in the upper left of FIG. 2.

In addition, a plurality of partial programs available to be incorporated into each individual are prepared in advance. The following description uses image filters as an example of partial programs to be incorporated into an individual; however, the partial programs are not limited to image filters, and programs for performing different types of image processing may be used instead. Note that, in the upper left of FIG. 2, the symbol "F" denotes an image filter, the symbol "I" denotes an input terminal, and the symbol "O" denotes an output terminal.

The image processing program generating process using genetic programming is performed, for example, in the following manner. First, a population 61 made up of a plurality of initial individuals is generated (step S11). As for each of the initial individuals, image filters are randomly selected from the prepared image filters and individually assigned to each of nodes in the initial individual. Next, from the generated population 61, two individuals are randomly taken out to be parent individuals (step S12).

Subsequently, the two parent individuals undergo an evolution process, which then generates two or more child individuals (step S13). In the evolution process, crossover and mutation operations are performed on the two parent individuals. The two parent individuals may generate three or more child individuals by respectively undergoing different crossover operations and mutation operations.

Next, as for each of the child individuals generated through the evolution process and the original parent individuals, a fitness score is calculated (step S14). In this step, image processing according to each individual is performed on the input image 51 of the learning data 50. Then, a resultant image obtained from the image processing is compared to its corresponding target image 52 to thereby calculate the fitness score of the individual. In the case where there are a plurality of sets of the learning data 50, with respect to each of the individuals, a fitness score is calculated for each set of the learning data 50. Then, the average of the fitness scores of each of the individuals is calculated and used as the fitness score of the individual.

If the fitness score of any of the individuals is equal to or more than a predetermined threshold, the individual is output as a final image processing program and, then, the image processing program generating process ends. On the other hand, if the fitness scores of all the individuals are below the predetermined threshold, survival selection is performed to select survivors from a population 62 including the generated child individuals and the two parent individuals (step S15). In the survival selection, an individual with the best fitness score is selected from the population 62. Further, one more individual is selected from the remaining individuals of the population 62 by a predetermined method. For example, the other individual is selected from the remaining individuals according to the probabilities associated with their fitness scores.

The two individuals favored by the survival selection are swapped with the two individuals taken out as the parent individuals amongst the individuals included in the population 61 (step S16). Herewith, the individuals included in the population 61 are changed into those of the new generation. Then, similar procedure is repeated until an individual with the fitness score being equal to or more than the predetermined threshold is produced.

Figure 3:
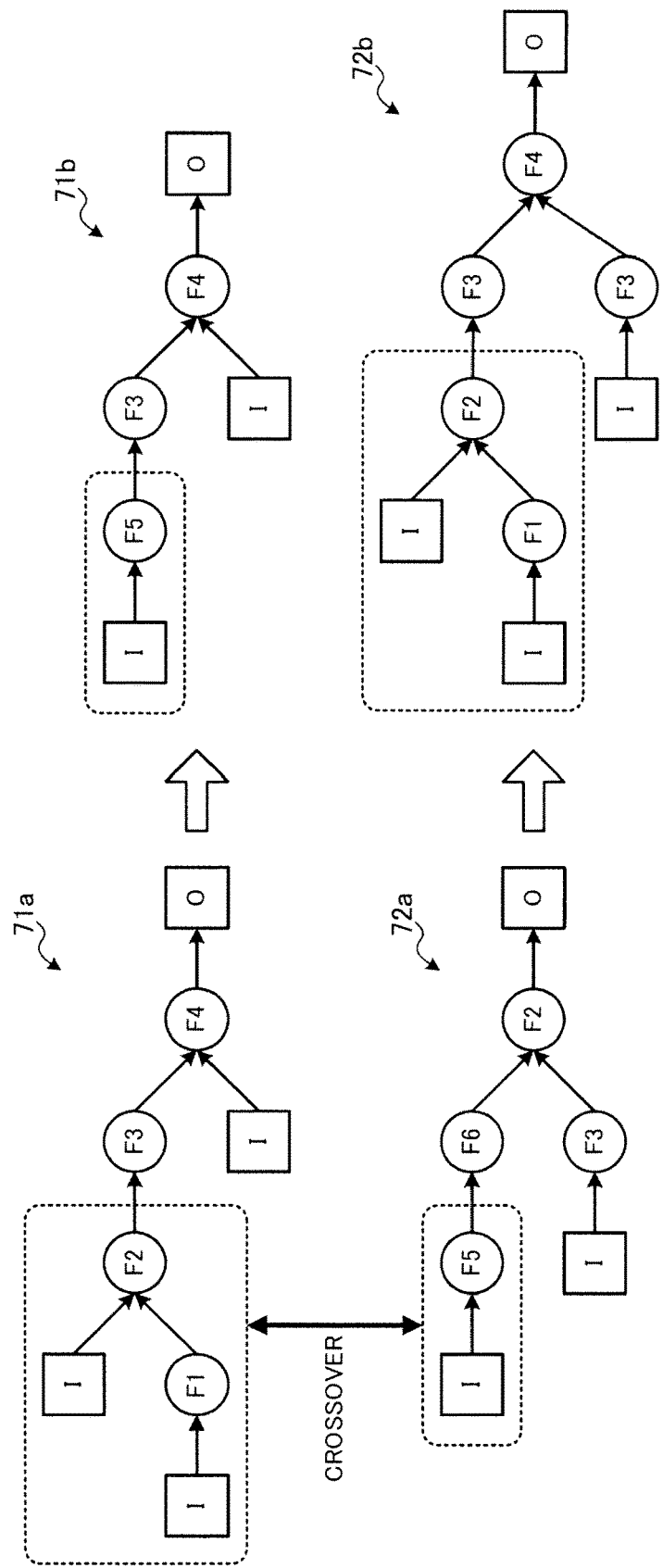
FIG. 3 illustrates an example of crossover.

FIG. 3 illustrates an example of crossover. FIG. 3 illustrates an example where crossover takes place between parent individuals 71a and 72a, thereby generating a child individual 71b derived from the parent individual 71a and a child individual 72b derived from the parent individual 72a.

The parent individual 71a includes image filters F1, F2, F3, and F4, and the parent individual 72a includes image filters F2, F3, F5, and F6. Assume here that the node of the image filter F2 in the parent individual 71a and the node of the image filter F5 in the parent individual 72a are selected as points of crossover.

In a crossover operation, for example, not only a selected node but also nodes in levels lower than the level of the selected node are targets of the crossover. Therefore, according to the example of FIG. 3, a section within the parent individual 71a, made up of "the image filters F2 and F1; a node of an input terminal connected to one end of the image filter F2; and a node of an input terminal connected to the image filter F1" is swapped with a section within the parent individual 72a, made up of "the image filter F5; and a node of an input terminal connected to the image filter F5". As a result, the crossover produces the child individual 71b including the image filters F3, F4, and F5 and the child individual 72b including one each of the image filters F1, F2, and F4 and two image filters F3.

Figure 4:
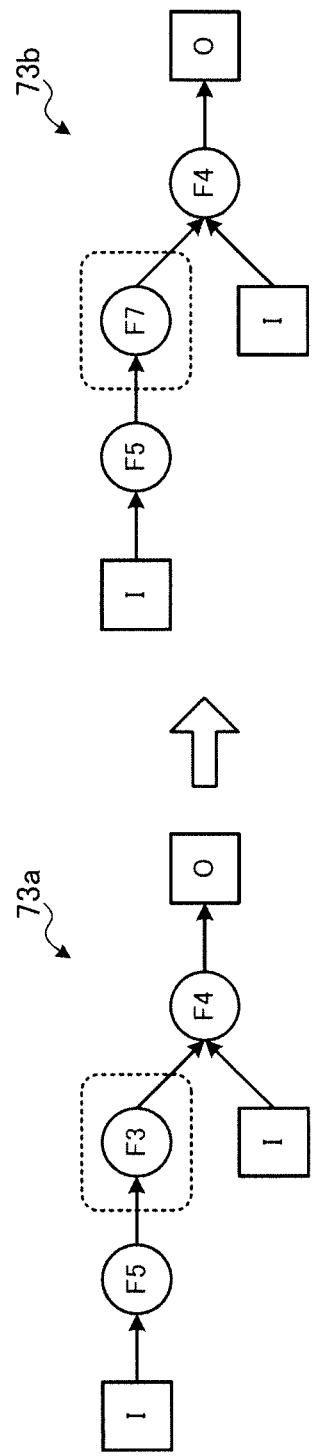
FIG. 4 illustrates an example of mutation.

FIG. 4 illustrates an example of mutation. According to FIG. 4, an individual 73a includes the image filters F3, F4, and F5. The individual 73a may be a parent individual taken out of the population 61, or an individual produced by performing crossover on the parent individuals taken out of the population 61.

Assume here that the node of the image filter F3 in the individual 73a is selected as a site for mutation, and an image filter F7 is selected as an image filter to replace the image filter F3. Note that the replacing image filter in the mutation operation is selected randomly from the prepared plurality of image filters. The mutation produces a child individual 73b including the image filters F4, F5, and F7.

Conceivable uses of an image processing program generated by the above-described procedures include, for example, achieving a desired effect by performing image processing on an image of a product in the factory automation (FA) field. Specifically, the image processing program may be used to perform image processing on an image of the appearance of a product to thereby extract sites with defects or extract points for image registration or alignment.

In such usage, it is sometimes the case that alterations and improvements made to a product to be an imaging subject, corresponding changes in the imaging environment, and the like, result in the need for reconstruction of an image processing algorithm. Therefore, the easiness of constructing an image processing algorithm is needed. In addition, there is also a need to construct an image processing algorithm robust to changes in the imaging environment, such as changes in lighting conditions, and variations in the shape, position, and orientation of the imaging subject.

By simply preparing in advance the input image 51 and its corresponding target image 52, an image processing program usable for such applications is easily generated using genetic programming. Further, by preparing in advance a plurality of pairs of the input image 51 and the target image 52 (a plurality of sets of the learning data 50) whose imaging environments are different from each other, it is possible to automatically generate an image processing algorithm robust to changes in the imaging environment.

In the image processing program generating process using genetic programming, high-quality image processing closer to targeted processing is more likely to be achieved when a larger number of selectable image filters are prepared.

Assume, for example, that a plurality of image filters which perform the same type of image process but each have a different parameter value set therein are prepared in advance. Further assume that the best suited parameter value to perform the particular image process is "8"; however, no image filter with the parameter value set to "8" has been prepared. In this case, the targeted processing may not be achieved with accuracy. Yet the processing may achieve a certain level of accuracy by applying a plurality of image filters of the same type, each having the parameter value set to anything but "8". In this case, however, the number of nodes in the tree structure is likely to increase, which in turn may lead to an increase in the time taken to end the learning.

Thus, a larger number of selectable image filters being available increases the possibility of achieving high-quality image processing. On the other hand, the availability of the large number of selectable image filters is likely to result in an increased amount of time needed to search for a combination of appropriate image filters, which then possibly increases the time for the image processing program generating process.

One of the factors that the processing time increases would be randomly selecting image filters in the generation of initial individuals and the evolution process of image filters. The random selection may result in selecting image filters not appropriate to achieve desired image processing.

For example, in the case where individuals including inappropriate image filters are selected from the initial population as parent individuals, each of the selected parent individuals and child individuals derived from the parent individuals is likely to have a low fitness score. Also in the case where child individuals including inappropriate image filters are generated in the evolution process, each of the child individuals is likely to have a low fitness score. Therefore, the generation of a larger number of individuals including inappropriate image filters leads to a greater possibility for wasted processes not contributing to an increase in the fitness scores to be performed during the image processing program generating process. This increases the possibility of slowing the progress of the learning.

In view of the above, the embodiment 1-2 takes the following measures in the image processing program generating process described above as a reference example. First, one or more image filters with configurable parameter values are prepared as those to be used in the image processing program generating process. Each of the image filters has a parameter whose value is configurable when the image filter is selected during the image processing program generating process. Such image filters are sometimes hereinafter referred to as "parameter-variable filters".

By configuring image filters as parameter-variable filters, only one image filter needs to be prepared for a plurality of processing tasks of the same type. The selectability of such image filters each allowing a variable parameter value to be set therein during the initial individual generation and the evolution process facilitates high-quality image processing.

In addition, with respect to each parameter value configurable in each of the parameter-variable filters, the selection probability associated with the effectiveness of the parameter value in achieving the targeted image processing is assigned to the parameter value. Then, parameter values with higher selection probabilities are arranged to be more likely to be selected in the initial individual generation and the evolution process. Herewith, even when an increased number of configurable parameter values are prepared for each parameter-variable filter, it is likely that a parameter value providing high effectiveness will be set when the parameter-variable filter is selected. This in turn reduces the possibility of an increase in the time for the image processing program generating process.

Next described are details of the image processing device according to the embodiment 1-2.

Figure 5:
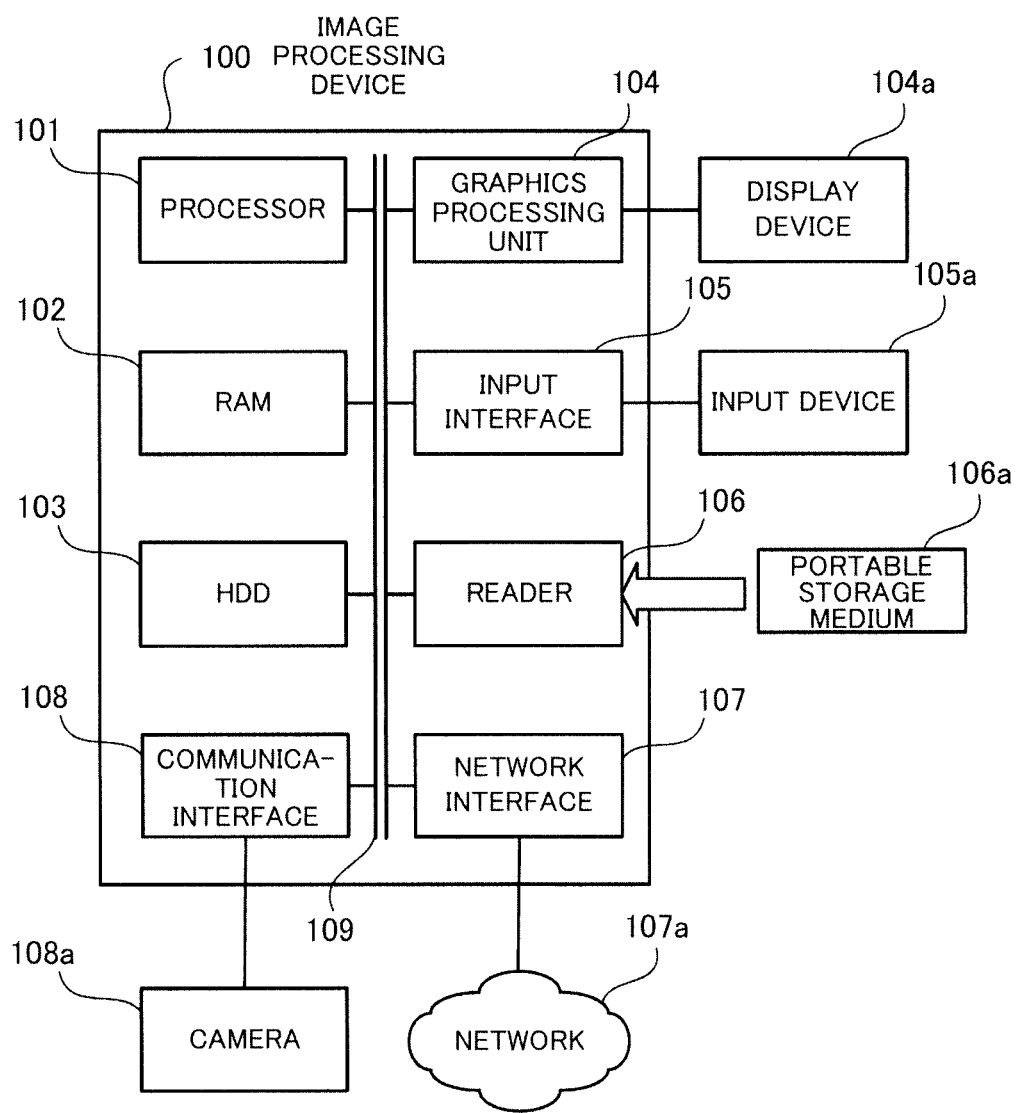
FIG. 5 illustrates an example of a hardware configuration of an image processing device.

FIG. 5 illustrates an example of a hardware configuration of the image processing device. An image processing device 100 is implemented, for example, as a computer illustrated in FIG. 5.

Overall control of the image processing device 100 is exercised by a processor 101. The processor 101 may be a multi-processor. The processor 101 is, for example, a central processing unit (CPU), a micro processing unit (MPU), a digital signal processor (DSP), an application specific integrated circuit (ASIC), a programmable logic device (PLD) or a combination of two or more of these.

To the processor 101, random access memory (RAM) 102 and a plurality of peripherals are connected via a bus 109.

The RAM 102 is used as a main storage device of the image processing device 100. The RAM 102 temporarily stores at least part of an operating system (OS) program and application programs to be executed by the processor 101. The RAM 102 also stores therein various types of data to be used by the processor 101 for its processing.

The peripherals connected to the bus 109 include a hard disk drive (HDD) 103, a graphics processing unit 104, an input interface 105, a reader 106, a network interface 107, and a communication interface 108.

The HDD 103 is used as a secondary storage device of the image processing device 100. The HDD 103 stores therein the OS program, application programs, and various types of data. Instead of the HDD 103, the image processing device 100 may be provided with a different type of secondary storage device such as a solid state drive (SSD).

To the graphics processing unit 104, a display device 104a is connected. According to an instruction from the processor 101, the graphics processing unit 104 displays an image on a screen of the display device 104a. A cathode ray tube (CRT) display or a liquid crystal display, for example, may be used as the display device 104a.

To the input interface 105, an input device 105a is connected. The input interface 105 transmits signals output from the input device 105a to the processor 101. The input device 105a is, for example, a keyboard or a pointing device. Examples of the pointing device include a mouse, a touch panel, a tablet, a touch-pad, and a track ball.

Into the reader 106, a portable storage medium 106a is loaded. The reader 106 reads data recorded on the portable storage medium 106a and transmits the read data to the processor 101. The portable storage medium 106a may be an optical disk, a magneto optical disk, or a semiconductor memory, for example.

Via a network 107a, the network interface 107 transmits and receives data to and from different devices.

The communication interface 108 transmits and receives data to and from an external device connected thereto. In this embodiment, a camera 108a is connected to the communication interface 108 as its external device, and the communication interface 108 transmits, to the processor 101, image data sent from the camera 108a.

The hardware configuration described above achieves processing functions of the image processing device 100.

Figure 6:
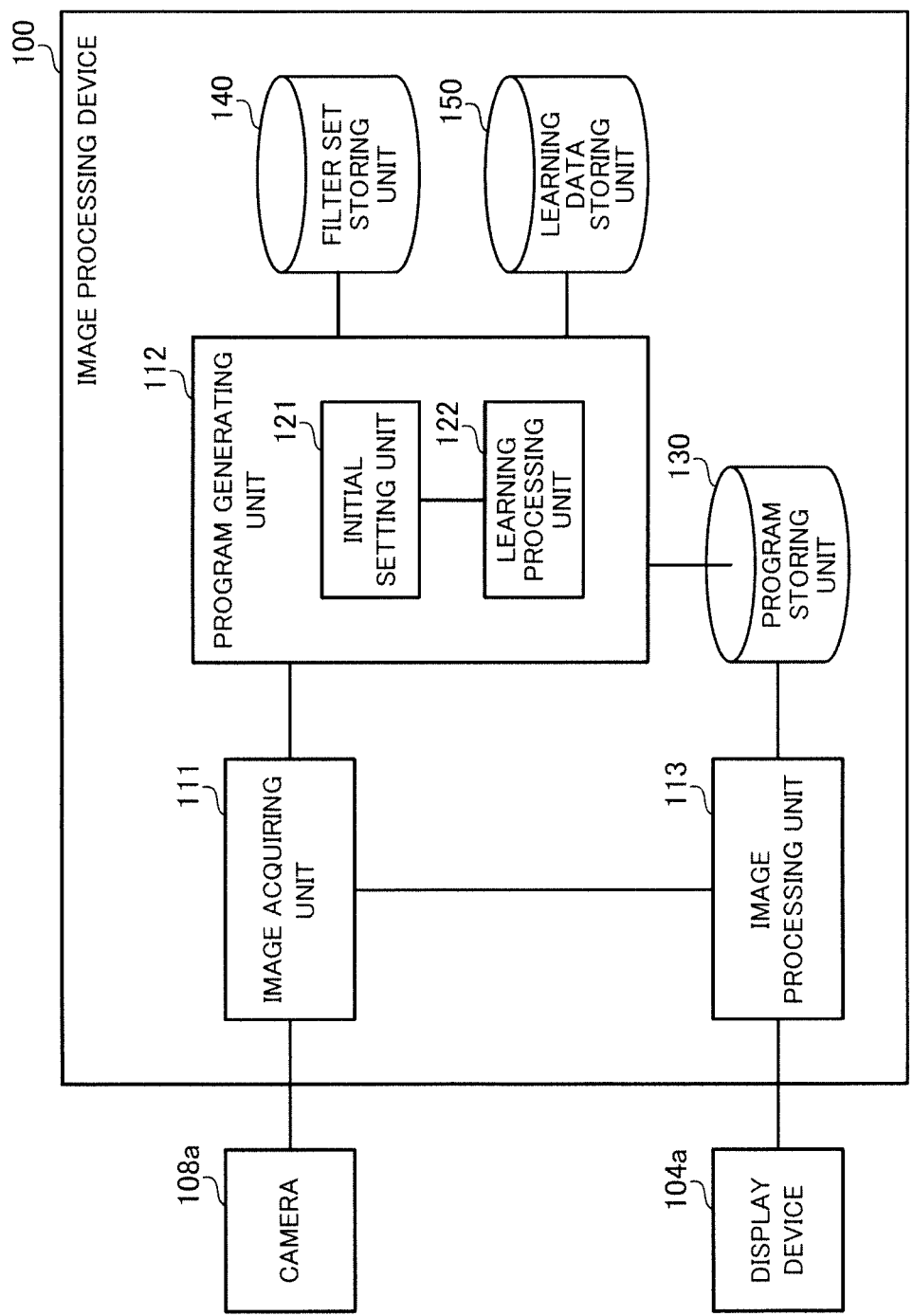
FIG. 6 is a block diagram illustrating a configuration example of processing functions of the image processing device.

FIG. 6 is a block diagram illustrating a configuration example of the processing functions of the image processing device. The image processing device 100 includes an image acquiring unit 111, a program generating unit 112, an image processing unit 113, a program storing unit 130, a filter set storing unit 140, and a learning data storing unit 150.

Processes performed by the image acquiring unit 111 and the program generating unit 112 are implemented, for example, by the processor 101 of the image processing device 100 executing predetermined programs. Each of the program storing unit 130, the filter set storing unit 140, and the learning data storing unit 150 is implemented using, for example, a storage area of the HDD 103 of the image processing device 100.

The image acquiring unit 111 acquires data of a captured image from the camera 108a, and then outputs the data to the program generating unit 112 or the image processing unit 113.

The program generating unit 112 generates an image processing program using genetic programming, and then stores the generated image processing program in the program storing unit 130.

Processes performed by the image processing unit 113 are implemented by the processor 101 of the image processing device 100 executing image processing programs stored in the program storing unit 130. The image processing unit 113 acquires data of an image captured by the camera 108a via the image acquiring unit 111, and performs image processing on the data of the captured image. The processed image is displayed, for example, on the display device 104a.

The filter set storing unit 140 stores therein a plurality of programs of image filters selectable by a learning processing unit 122. The image filters stored in the filter set storing unit 140 include one or more parameter-variable filters. Each of the parameter-variable filters has a parameter whose value is configurable when the parameter variable filter is selected in the image processing program generating process. The filter set storing unit 140 also stores therein the selection probabilities set for respective configurable parameter values of each of the parameter-variable filters.

Further, the filter set storing unit 140 stores, as for some of the parameter-variable filters stored therein, information indicating their characteristics. The information is referenced to calculate the selection probabilities of respective parameter values of a corresponding parameter-variable filter.

The learning data storing unit 150 stores therein one or more sets of learning data, each including a pair of an input image and a target image. The input image included in each set of learning data is, for example, an image captured by the camera 108a connected to the image processing device 100.

The program generating unit 112 includes an initial setting unit 121 and the learning processing unit 122. Note that the initial setting unit 121 is an example of the setting unit 11 of FIG. 1. The learning processing unit 122 is an example of the selection processing unit 12 of FIG. 1.

The initial setting unit 121 performs an initial setting process in order to implement the image processing program generating process. For example, the initial setting unit 121 calculates the selection probabilities of respective parameter values of each parameter-variable filter, and sets the calculated selection probabilities in the filter set storing unit 140 in association with the corresponding parameter values. In addition, as for some image filters stored in the filter set storing unit 140, the initial setting unit 121 determines parameter values to be set therein, based on the learning data.

The learning processing unit 122 generates an image processing program by means of genetic programming, using image filters having undergone the initial setting process performed by the initial setting unit 121 and the learning data stored in the learning data storing unit 150. In this image processing program generating process, if having selected a parameter-variable filter as a filter to be assigned to a node of an initial individual, the learning processing unit 122 selects a parameter value to be set in the parameter-variable filter according to the selection probabilities associated with respective parameter values configurable in the parameter-variable filter. In addition, if having selected a parameter-variable filter as a replacing image filter in a mutation operation, the learning processing unit 122 selects a parameter value to be set in the parameter-variable filter according to the selection probabilities associated with respective parameter values configurable in the parameter-variable filter.

Next described is an example of information stored in the filter set storing unit 140. The filter set storing unit 140 stores therein a filter set database and a filter characteristic database.

Figure 7:
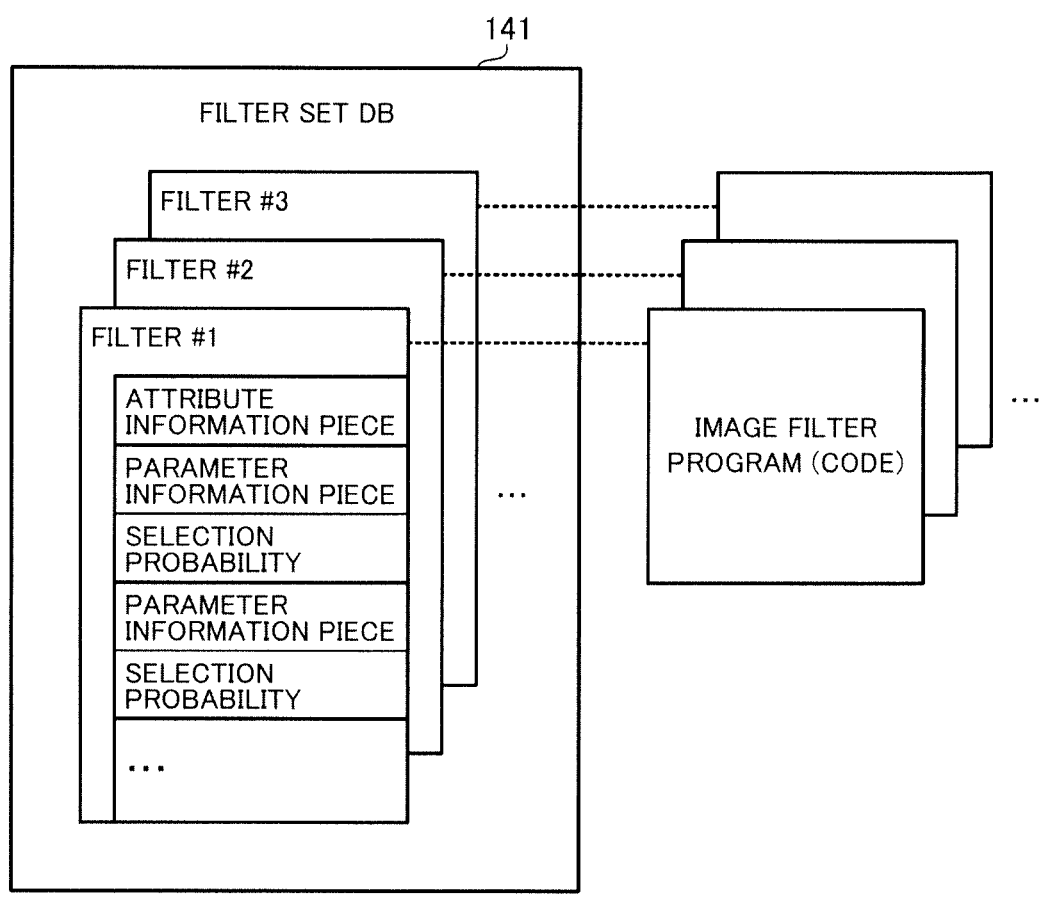
FIG. 7 illustrates an example of information registered in a filter set database.

FIG. 7 illustrates an example of information registered in the filter set database.

In a filter set database 141, a record is registered for each image filter available to be incorporated in an image processing program. Each record has a filter identifier (ID) for identifying a corresponding image filter. According to the example of FIG. 7, "filter #1" indicates an image filter with a filter identifier "1". Each record is associated with a program code of a single image filter program. Note that the associated program codes are stored, for example, in the filter set storing unit 140.

An attribute information piece is registered in each record of the filter set database 141. The attribute information piece of each record indicates which one of the following filters is its corresponding image filter: a parameter-variable filter; a parameter undetermined filter; or a normal filter. Parameter undetermined filters are image filters without a needed parameter value set therein in an initial state. As for each parameter undetermined filter, each time the image processing program generating process is executed, the initial setting unit 121 sets a parameter value in the parameter undermined filter based on the learning data in the initial setting operation during the image processing program generating process. According to this embodiment, mask filters are registered as parameter undetermined filters. Normal filters are image filters other than parameter-variable filters and parameter undetermined filters.

Further, as for each record corresponding to a parameter-variable filter amongst records in the filter set database 141, a plurality of parameter information pieces and the selection probabilities corresponding one-to-one with the parameter information pieces are registered. Each parameter information piece has one or more parameter values configurable in its corresponding parameter-variable filter. For example, in the case where two types of parameters are configurable in a parameter-variable filter, a combination of numerical values of the two types of parameters is registered as each parameter information piece. Such parameter information pieces are registered in advance in its corresponding record.

Note that, in the case where a parameter-variable filter is selected as an image filter to be incorporated into an individual during the image processing program generating process, one or more parameter values to be set in the parameter-variable filter are then selected. Therefore, a larger number of parameter information pieces being registered in the filer set database 141 in association with respective parameter-variable filters practically allows a larger number of image filters to be incorporated into an individual, resulting in a larger number of image processing procedures to be performed. This raises the possibility of achieving high-quality image processing close to targeted processing.

In the case of using parameter-variable filters whose parameter values are configurable afterward as described above, only a single program code needs to be pre-stored for each parameter-variable filter in the filter set storing unit 140, regardless of the number of configurable numerical variations in each parameter. Therefore, it is possible to reduce storage capacity requirements of the filter set storing unit 140 while raising the possibility of achieving high-quality image processing.

Each selection probability indicates the probability that, when an associated parameter-variable filter has been selected to be assigned to a node in an initial individual or mutation target node, its corresponding parameter value will be selected to be set in the selected parameter-variable filter. Each time the image processing program generating process is executed, the selection probabilities are set by the initial setting unit 121 in the initial setting operation during the image processing program generating process.

Note here that examples of parameter-variable filters include low-pass filters, high-pass filters, band pass filters, differential filters, and threshold filters. Gaussian filters are an example of low-pass filters (smoothing filters). Sobel, Laplace, and Prewitt filters are examples of differential filters.

The following are examples of one or more parameters configurable in each parameter-variable filter. As for low-pass, high-pass, and band pass filters, the filter size (or kernel size) is configurable as a parameter. As for Sobel and Prewitt filters, the differential degrees in the x and y directions and the filter size, or one of these, is configurable as a parameter. As for Laplace filters, the filter size is configurable as a parameter. As for threshold filters, a threshold is configurable as a parameter.

Figure 8:
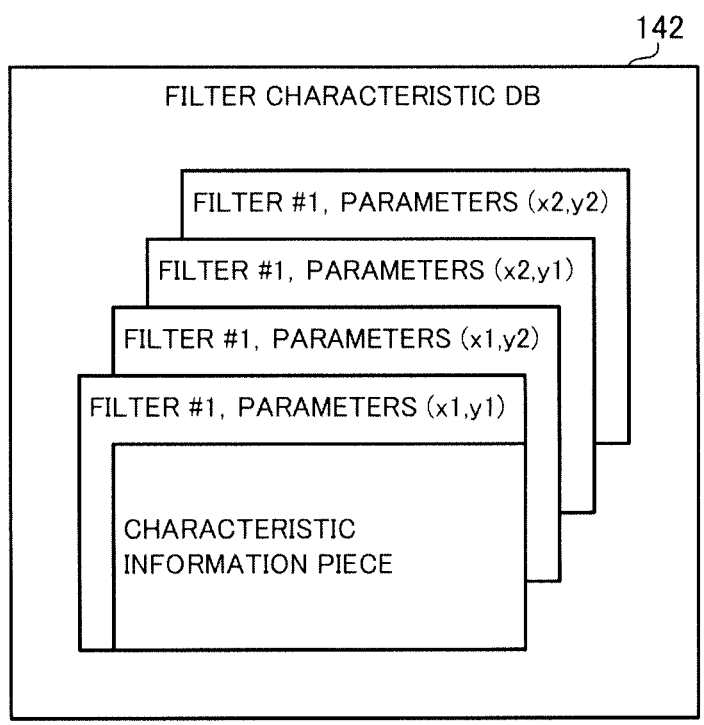
FIG. 8 illustrates an example of information stored in a filter characteristic database.

FIG. 8 illustrates an example of information stored in the filter characteristic database. A filter characteristic database 142 registers, as for some of parameter-variable filters, a characteristic information piece for each parameter information piece. FIG. 8 illustrates an example where a characteristic information piece is registered for each of parameter information pieces of parameter values "x1, y1", "x1, y2", "x2, y1", and "x2, y2" configurable in the parameter-variable filter with the filter identifier "1" ("filter #1").

According to this embodiment, by way of example, the filter characteristic database 142 registers characteristic information pieces of image filters each increasing or decreasing signal components in a particular spatial frequency range, such as low-pass, high-pass, and band pass filters. In this case, each of the registered characteristic information pieces indicates frequency characteristics of its corresponding image filter (transmittance characteristics to spatial frequencies). An example of such characteristic information pieces is described later.

Figure 9:
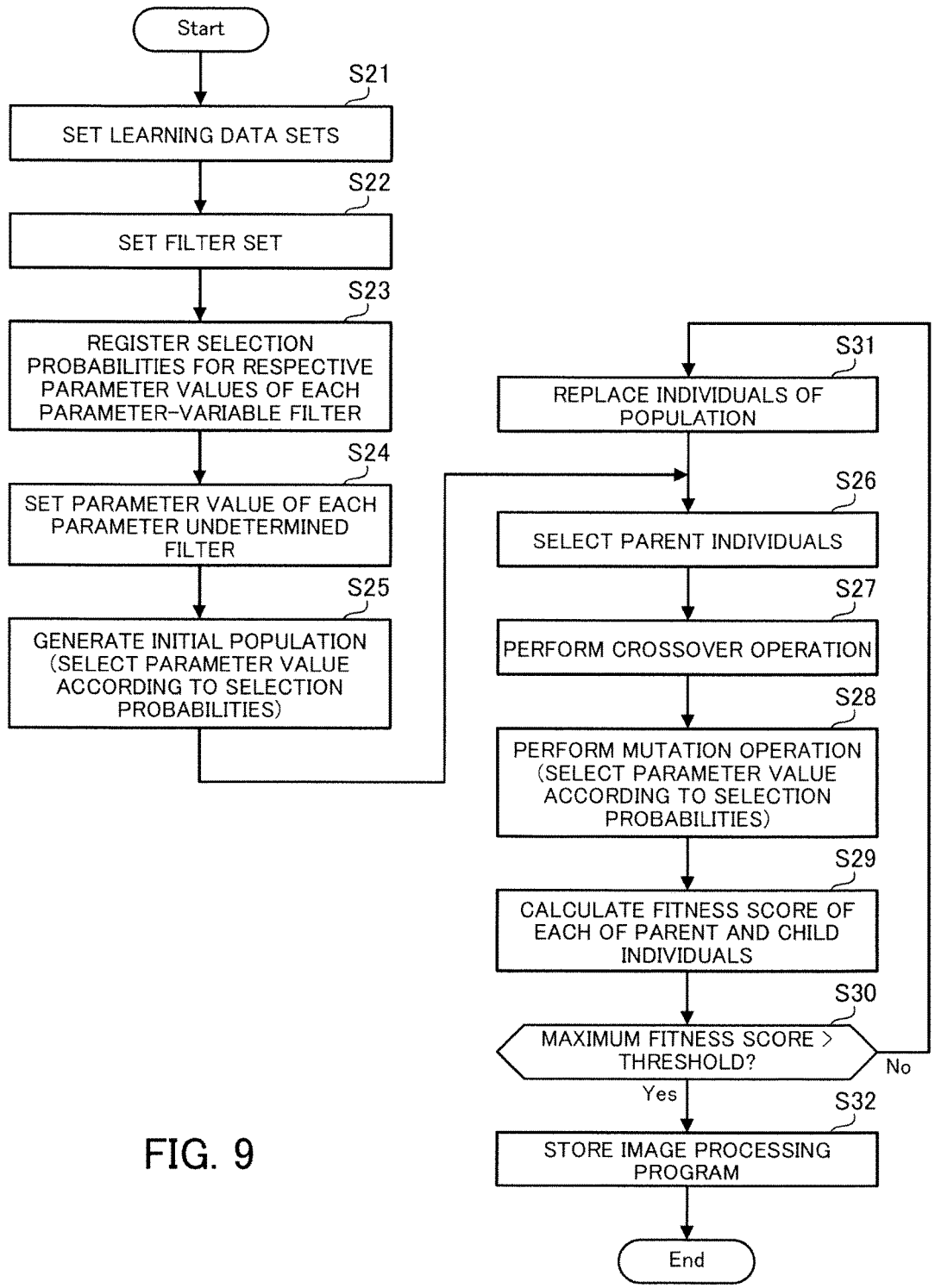
FIG. 9 is a flowchart illustrating an example of an overall procedure of an image processing program generating process.

The procedure of the image processing program generating process is described next in detail. FIG. 9 is a flowchart illustrating an example of an overall procedure of the image processing program generating process.

[Step S21] The initial setting unit 121 receives an input operation for setting one or more learning data sets. For example, learning data sets to be used in this image processing program generating process are designated from among the learning data sets stored in the learning data storing unit 150.

[Step S22] The initial setting unit 121 receives an input operation for setting a filter set. For example, image filters to be used in this image processing program generating process are designated from among the image filters registered in the filter set database 141.

[Step S23] As for each parameter-variable filter included in the image filters designated in step S22, the initial setting unit 121 calculates the selection probabilities for respective parameter values and then registers the calculated selection probabilities in the filter set database 141. Details of this step are described later with reference to FIGS. 11 to 17.

[Step S24] As for each parameter undetermined filter included in the image filters designated in step S22, the initial setting unit 121 determines, based on the learning data sets, a parameter value to be set in the parameter undetermined filter. The initial setting unit 121 sets the determined parameter value in the program code of the parameter undetermined filter, to thereby make the program code executable. Details of step S24 are described later with reference to FIGS. 18 to 20.

[Step S25] The learning processing unit 122 generates a population including a predetermined number of initial individuals ("initial population"). Each initial individual is generated by randomly selecting the image filters designated in step S22 and assigning the selected image filters to respective nodes of the initial individual. In the case where a parameter-variable filter has been selected, the learning processing unit 122 selects a parameter value to be set in the selected parameter-variable filter. In this regard, the parameter value selection is made according to the selection probabilities corresponding to respective parameter values stored, within the filter set database 141, in association with the parameter-variable filter. Details of step S25 are described later with reference to FIG. 10.

Note that the population generated in step S25 is denoted hereinafter by the "population 61" because it corresponds to the population 61 of FIG. 2.

[Step S26] The learning processing unit 122 randomly selects two parent individuals from the individuals included in the population 61.

[Step S27] The learning processing unit 122 performs a crossover operation on the two selected parent individuals to thereby generate a predetermined number of, two or more, child individuals.

[Step S28] The learning processing unit 122 introduces a mutation into a node of one of the generated child individuals by replacing an image filter having been assigned to the node with a different image filter designated in step S22.

In the case of having selected a parameter-variable filter as the replacing image filter, the learning processing unit 122 selects a parameter value to be set in the selected parameter-variable filter. In this regard, the parameter value selection is made according to the selection probabilities corresponding to respective parameter values stored, within the filter set database 141, in association with the parameter-variable filter.

Details of the process of selecting the replacing image filter in step S28 are described later with reference to FIG. 10.

[Step S29] A fitness score is calculated for each of the parent individuals selected in step S26 and the child individuals obtained by steps S27 and S28. In this step, the following process is performed on each of the calculation target individuals.

The learning processing unit 122 selects one of the learning data sets designated in step S21 and applies processing indicated by the calculation target individual to the input image included in the selected learning data set. The learning processing unit 122 determines the fitness score by calculating the degree of agreement between an image acquired by the processing indicated by the calculation target individual and the target image included in the selected learning data set. The learning processing unit 122 performs this fitness score calculation process using each of all the learning data sets designated in step S21. The learning processing unit 122 calculates the average of all the calculated fitness scores, and outputs the average as the fitness score of the calculation target individual.

[Step S30] The learning processing unit 122 determines whether the maximum value among the fitness scores of the individuals calculated in step S29 is greater than a predetermined threshold. If the maximum value of the fitness scores is greater than the threshold, the process moves to step S32. On the other hand, if the maximum value of the fitness scores is equal to or below the threshold, the process moves to step S31.

[Step S31] The learning processing unit 122 selects, amongst the parent individuals selected in step S26 and the child individuals acquired in steps S27 and S28, an individual with the maximum fitness score to be kept for the next generation. Further, the learning processing unit 122 selects, amongst the remaining individuals, one more individual to be kept for the next generation. This selection is made, for example, according to the probabilities corresponding to the calculated fitness scores.

The learning processing unit 122 replaces, amongst the individuals included in the population 62, the two individuals selected in step S26 with the two individuals selected to be kept for the next generation. Herewith, the next generation of the population 62 is formed.

[Step S32] The learning processing unit 122 selects, amongst the individuals whose fitness scores are calculated in step S29, the individual with the maximum fitness score. The learning processing unit 122 stores, in the program storing unit 130, the image processing program indicated by the selected individual and then ends the image processing program generating process.

Next described are details of the process of selecting an image filter to be assigned to each node of the individuals in step S25 and the process of selecting an image filter newly assigned to the mutation target node in step S28. In these selecting processes, the learning processing unit 122 performs the procedure illustrated in the following FIG. 10.

Figure 10:
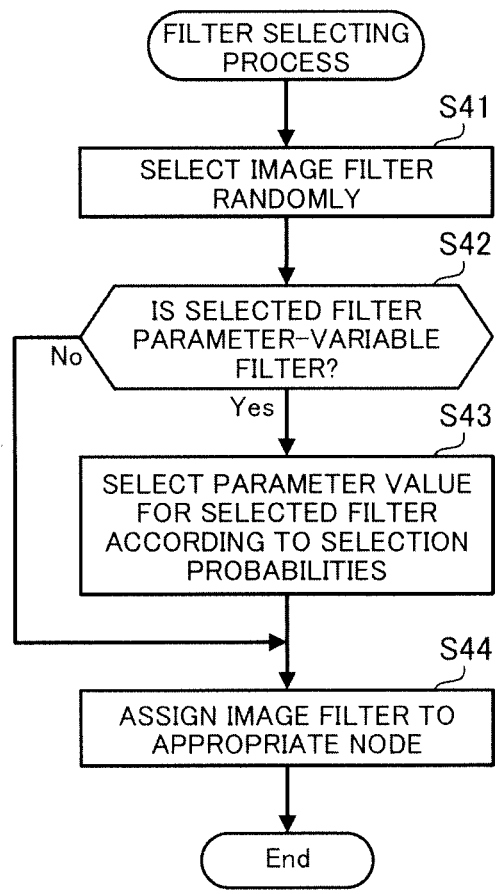
FIG. 10 is a flowchart illustrating an example of a processing procedure for selecting an image filter.

FIG. 10 is a flowchart illustrating an example of a processing procedure for selecting an image filter.

[Step S41] The learning process unit 122 selects, amongst the image filters designated in step S22, an image filter randomly (that is, with an equal probability of being chosen).

Note that, in step S41, the selection probability may be set for each of the designated image filters in consideration of the number of parameter values configurable in parameter-variable filters included in the designated image filters. For example, assume that the number of parameter-variable filters included in the designated image filters is n, and the total number of parameter undetermined filters and normal filters therein is m. Further assume that p different combinations of parameter values are configurable in each of the parameter-variable filters (that is, in the filter set database 141, p parameter information pieces are registered for each of the parameter-variable filters). In this case, for example, the selection probability of each of the parameter-variable filters in step S22 is obtained by $p/(n \cdot p+m)$. In addition, the selection probability of each of the parameter undetermined and normal filters in step S22 is obtained by $1/(n \cdot p+m)$.

[Step S42] The learning processing unit 122 determines whether the image filter selected in step S41 is a parameter-variable filter. The determination is made based on the attribute information piece registered, within the filter set database 141, in the record associated with the selected image filter. If the selected image filter is a parameter-variable filter, the process moves to step S43. On the other hand, if the selected image filter is not a parameter-variable filter but a different type of image filter, the process moves to step S44.

[Step S43] The learning processing unit 122 selects a parameter value for the parameter-variable filter according to the selection probabilities for respective configurable parameter values, registered, within the filter set database 141, in a record corresponding to the selected image filter.

[Step S44] The learning processing unit 122 assigns the image filter selected in step S41 to an appropriate node. In this regard, if the selected image filter is a parameter-variable filter, the learning processing unit 122 sets the parameter value selected in step S43 in the image filter to be assigned to the node.

Next described are details of the process of setting the selection probabilities for respective configurable parameter values of each parameter-variable filter in step S23 of FIG. 9. In the following description, Gaussian, threshold, and Sobel filters are used as examples of parameter-variable filters.

First, the process of setting the selection probabilities for parameter values of a Gaussian filter is described with reference to FIGS. 11 to 14. As for a Gaussian filter, characteristic information pieces for the respective parameter values are registered in the filter characteristic database 142, and the characteristic information pieces are referred to in the selection probability setting process.

Figure 11:
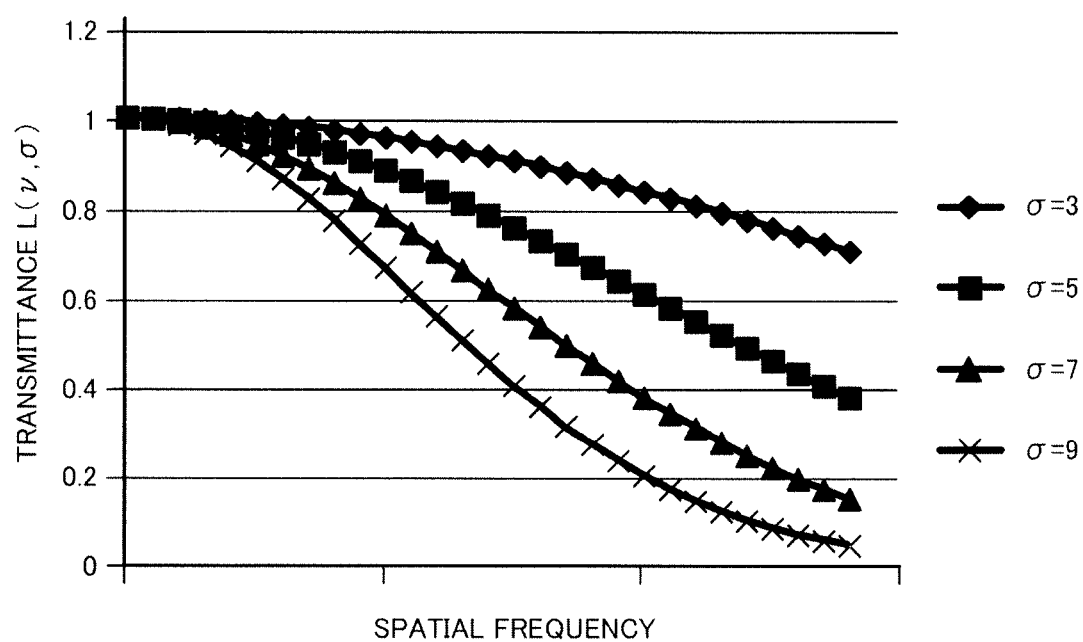
FIG. 11 illustrates an example of characteristic information on a Gaussian filter.

FIG. 11 illustrates an example of characteristic information on a Gaussian filter. In the filter characteristic database 142, information indicating the transmittance of the Gaussian filter with each of the configurable parameter values set therein to spatial frequencies is registered in advance as the characteristic information piece of the Gaussian filter. Assume that the transmittance here indicates luminance transmittance, for example. Assume also that the filter size (kernel size) is configurable in the Gaussian filter as a parameter.

Transmittance $L(v, \sigma)$ of the Gaussian filter is expressed by the following Equation (1):

$$L(v,\sigma) = \exp\{-(\alpha v^2/\sigma^2)\} \quad (1),$$

where $v$ is the spatial frequency, $\sigma$ is the parameter (filter size), and $\alpha$ is the coefficient specific to the image filter.

FIG. 11 illustrates, as an example, the transmittance obtained when each of values "3", "5", "7", and "9" is assigned to the parameter $\sigma$ of the Gaussian filter.

Figure 12:
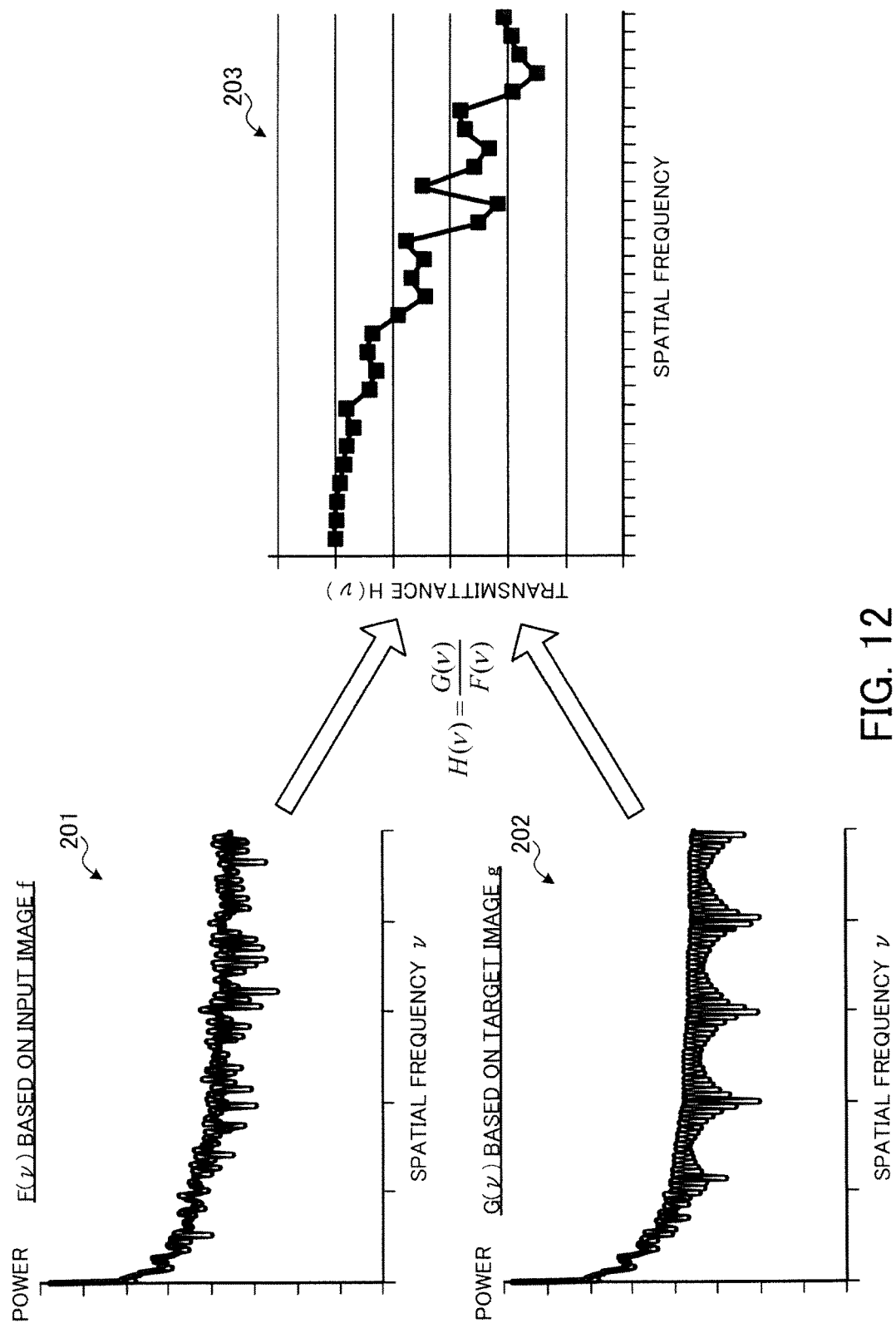
FIG. 12 illustrates an example of how to calculate transmittance based on an input image and a target image.
Figure 13:
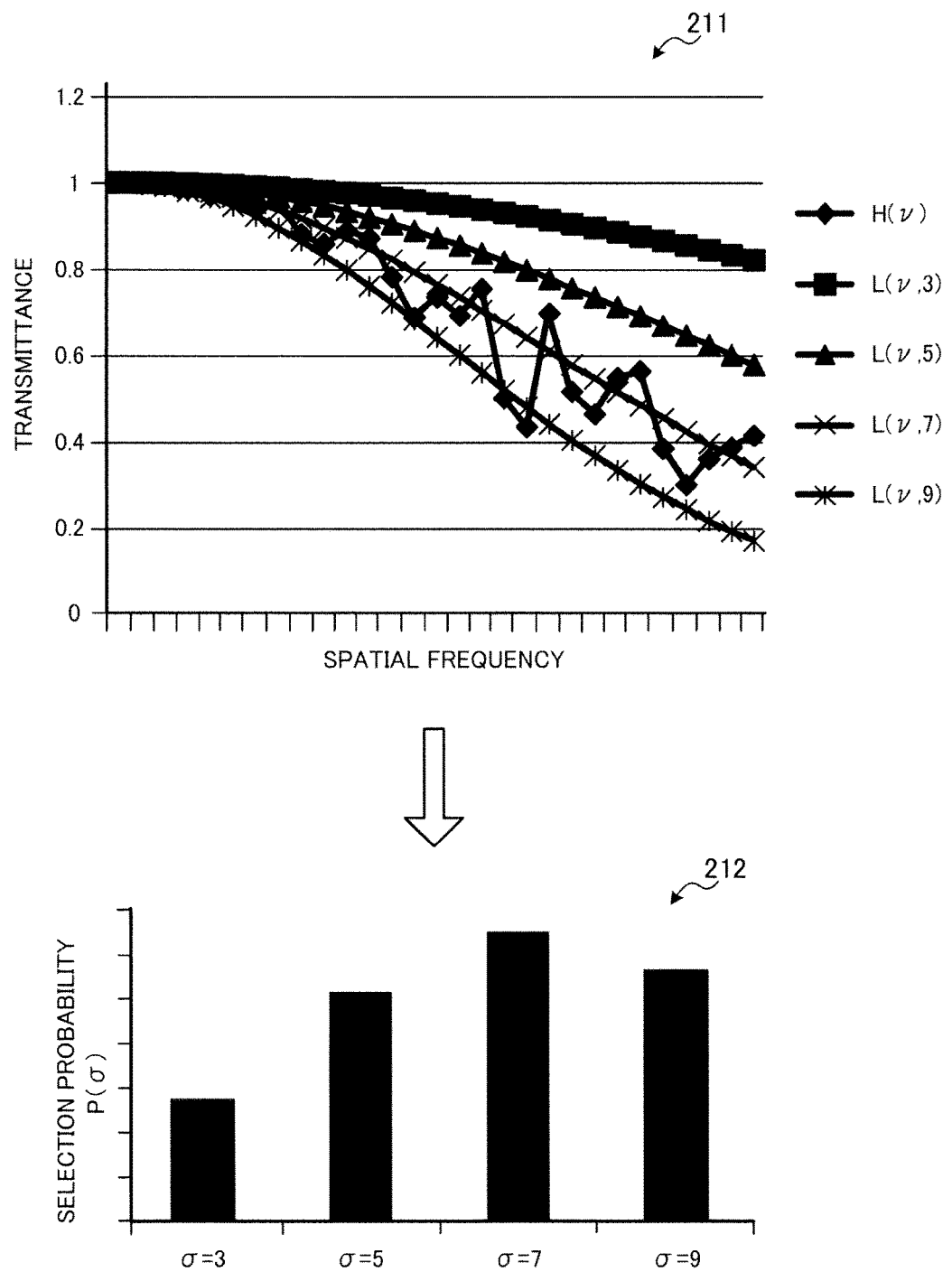
FIG. 13 illustrates an example of how to calculate selection probabilities based on a transmittance comparison.

FIG. 12 illustrates an example of how to calculate the transmittance based on an input image and a target image. FIG. 13 illustrates an example of how to calculate the selection probabilities based on a transmittance comparison.

First, based on the learning data set designated in step S21 of FIG. 9, the initial setting unit 121 obtains the transmittance (frequency transmittance characteristics) from the input image of the learning data set in relation to its corresponding target image. Assume here that one pair of an input image and a target image is designated.

In order to calculate the transmittance, the initial setting unit 121 performs the Fourier transform of the input image and the corresponding target image to thereby convert data of each of the images into data in the frequency domain. Converted data $F(v)$ obtained by performing the Fourier transform of luminance values of an input image f is represented, for example, by a graph 201 in the upper left of FIG. 12. In addition, converted data $G(v)$ obtained by performing the Fourier transform of luminance values of a target image g is represented, for example, by a graph 202 in the lower left of FIG. 12. Transmittance $H(v)$ is obtained by the following Equation (2):

$$H(v) = G(v)/F(v) \quad (2).$$

A graph 203 on the right side of FIG. 12 represents an example of the transmittance $H(v)$ calculated from Equation (2) based on the converted data $F(v)$ and $G(v)$ represented by the graphs 201 and 202, respectively.

Next, the initial setting unit 121 calculates the correlation between the transmittance $H(v)$, calculated based on the input image f and the target image g, and the transmittance $L(v, \sigma)$ of each parameter value registered in the filter characteristic database 142 as a characteristic information piece. A correlation coefficient $R(\sigma)$ representing the correlation between the transmittance $H(v)$ and the transmittance $L(v, \sigma)$ corresponding to the parameter $\sigma$ is calculated, for example, from the following Equation (3).

$$R(\sigma) = \frac{\sum_v H(v)L(v, \sigma)}{\sqrt{\sum_v H(v)^2 \times \sum_v L(v, \sigma)^2}} \quad (3)$$

Note here that, amongst the parameter values, a parameter value whose corresponding transmittance $L(v, \sigma)$ has a higher correlation with the calculated transmittance $H(v)$ is more likely to produce image processing close to targeted processing when the parameter value is set in the Gaussian filter and is, therefore, assumed to provide high effectiveness. In view of this, the initial setting unit 121 sets the selection probabilities for the respective parameter values in such a manner that parameter values having higher correlations with the transmittance $H(v)$ have higher selection probabilities.

The selection probability of each value of the parameter $\sigma$ for an image filter is calculated, for example, using the following Equation (4) that normalizes the correlation coefficient $R(\sigma)$ of each value of the parameter $\sigma$.

$$P(\sigma) = \frac{R(\sigma)}{\sum_\sigma R(\sigma)} \quad (4)$$

A graph 211 in the upper part of FIG. 13 illustrates the transmittance $L(v, \sigma)$ of each parameter value of FIG. 11 and the transmittance $H(v)$ of the graph 203 in FIG. 12 plotted on top of each other. According to this example, the correlation of the transmittance $L(v, \sigma)$ of each value of the parameter $\sigma$ with the calculated transmittance $H(v)$ decreases in the order of the parameter values "7", "9", "5", and "3" of the parameter $\sigma$. In this case, selection probabilities $P(\sigma)$ are defined, for example, as represented by a graph 212 on the lower part of FIG. 13.

Note that the example illustrated in FIGS. 12 and 13 represents the process taking place when only one pair of an input image and a target image is used. In the case of using a plurality of pairs of an input image and a target image, the initial setting unit 121 calculates the correlation coefficient for each pair, then calculates the average of the correlation coefficients with respect to each parameter value, and determines the selection probabilities based on the calculated averages, as illustrated in FIG. 14 below.

Figure 14:
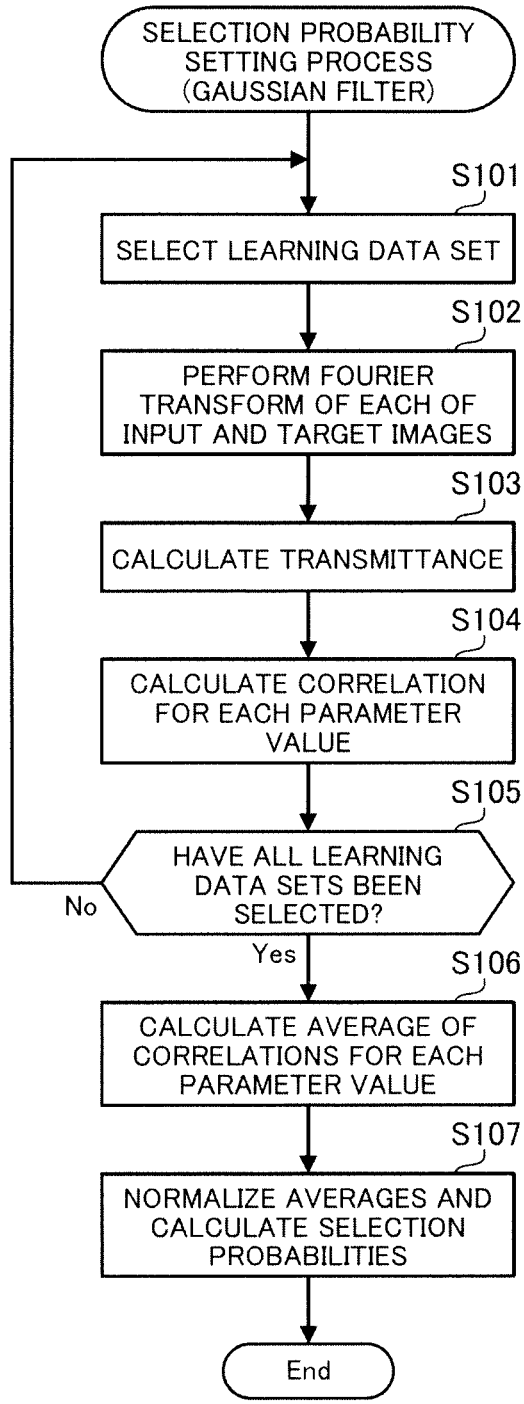
FIG. 14 is a flowchart illustrating an example of a selection probability setting process for parameter values of a Gaussian filter.

FIG. 14 is a flowchart illustrating an example of a selection probability setting process for parameter values of a Gaussian filter.

[Step S101] The initial setting unit 121 selects one learning data set (that is, a pair of an input image and a target image) amongst the learning data sets designated in step S21 of FIG. 9.

[Step S102] The initial setting unit 121 performs the Fourier transform of each of the input image and the target image included in the selected learning data set.

[Step S103] Based on respective data sets obtained by the Fourier transform, the initial setting unit 121 calculates the transmittance H(v) using Equation (2) above.

[Step S104] Using Equation (3) above, the initial setting unit 121 calculates the correlation coefficient R($\sigma$) between the calculated transmittance H(v) and the transmittance L(v, $\sigma$) associated, as a characteristic information piece, with each value of the parameter $\sigma$ configurable in the Gaussian filter. The transmittance L(v, $\sigma$) is obtained from each record associated with the Gaussian filter, registered in the filter characteristic database 142.

[Step S105] The initial setting unit 121 determines whether all the learning data sets designated in step S21 of FIG. 9 have been selected. If there is an unselected learning data set, the process returns to step S101. If all the learning data sets have been selected, the process moves to step S106.

[Step S106] With respect to each parameter value, the initial setting unit 121 calculates an average Rave($\sigma$) of the correlation coefficients R($\sigma$) calculated based on the different learning data sets in steps S101 to S105. Herewith, the average Rave($\sigma$) is calculated for each value of the parameter $\sigma$.

[Step S107] The initial setting unit 121 normalizes the average Rave($\sigma$) of the correlation coefficients for each value of the parameter $\sigma$ to thereby calculate the selection probability of each value of the parameter $\sigma$. The selection probability is calculated by plugging the average Rave($\sigma$) of the correlation coefficients for each value of the parameter $\sigma$ in Equation (4), in place of the correlation coefficient R($\sigma$) of each value of the parameter $\sigma$. The initial setting unit 121 registers, in the record corresponding to the Gaussian filter within the filter set database 141, each of the calculated selection probabilities in association with its corresponding parameter value.

By the processes of FIGS. 11 to 14, with respect to each of the configurable parameter values, the effectiveness indicating how close the image processing achieved by the Gaussian filter with the parameter value set therein is to the image processing for converting an input image into a corresponding target image is calculated as the correlation coefficient, or the average of the correlation coefficients. Then, the selection probability according to the correlation coefficient, or the average of the correlation coefficients, is set for the parameter value. Herewith, when the Gaussian filter has been selected as an image filter to be assigned to a node during the process of the learning processing unit 122, a parameter value achieving image processing close to targeted processing is likely to be set in the Gaussian filter.

Note that, as for parameter-variable filters for performing a process of increasing or decreasing signal components in a particular spatial frequency range, such as low-pass filters other than Gaussian filters, high-pass filters, and band pass filters, it is also possible to set the selection probabilities for respective configurable parameter values by the same process as that of FIGS. 11 to 14 above.

Next, the process of setting the selection probabilities for parameter values of a threshold filter is described with reference to FIGS. 15 and 16.

A threshold filter is an image filter for performing a predetermined conversion process of a pixel value (here, a luminance value) of each pixel when the pixel value is equal to or more than, or less than, a threshold. The conversion process converts, for example, the pixel value into the maximum or minimum value. Assume in the following description that a threshold is configurable in a threshold filter as a parameter. The threshold is represented by a luminance value.

Figure 15:
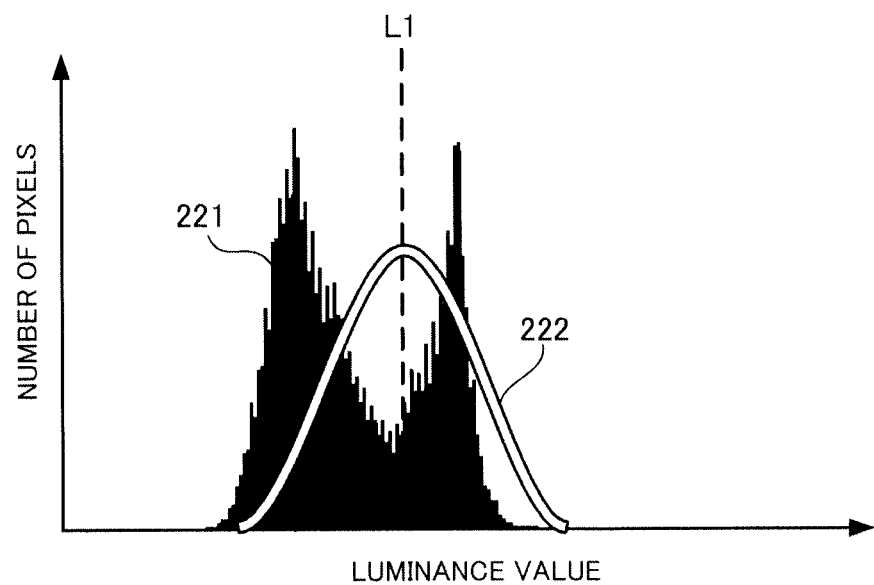
FIG. 15 illustrates a luminance histogram and an example of setting the selection probabilities.

FIG. 15 illustrates a luminance histogram and an example of setting the selection probabilities.

For example, the initial setting unit 121 first calculates a histogram of luminance values based on the input image included in the learning data set. Next, the initial setting unit 121 determines where a valley of the histogram is located. The position of the valley is determined, for example, based on differential values of the histogram. Alternatively, the position of the valley may be determined as a position with the minimum value located between two peaks in the histogram.

The initial setting unit 121 plots a normal distribution diagram representing the selection probability distribution with its center at the determined valley position. That is, if a luminance value as a parameter value is located closer to the determined valley position, a higher selection probability is assigned to the parameter value. On the other hand, if a luminance value as a parameter value is located further from the determined valley position, a lower selection probability is assigned to the parameter value.

The threshold is set, for example, in such a manner as to extract a region with characteristics of some sort within the input image from the remaining region. It is often the case that distribution of pixel values in the region with characteristics of some sort is separated from distribution of pixel values in the remaining region. Then, the valley position in the luminance histogram is often found near the boundary between these distributions. Therefore, in the case of processing an input image using a threshold filter, it is considered that the valley position in a luminance histogram based on the input image is often found near a threshold to be set.

According to the example of FIG. 15, a valley position L1 is obtained based on a luminance histogram 221, and a normal distribution curve 222 representing the selection probability distribution is plotted with its center at the valley position L1. Each configurable parameter value is expressed as a discrete luminance value on the horizontal axis, and its selection probability is determined from the curve 222.

Note that the example illustrated in FIG. 15 above represents the process taking place when only one pair of an input image and a target image is used. In the case of using a plurality of pairs of an input image and a target image, the initial setting unit 121 calculates luminance histograms for the respective pairs, then calculates the average of valley positions of the luminance histograms, and plots a normal distribution curve representing the selection probability distribution with its center at the calculated average, as illustrated in FIG. 16 below.

Figure 16:
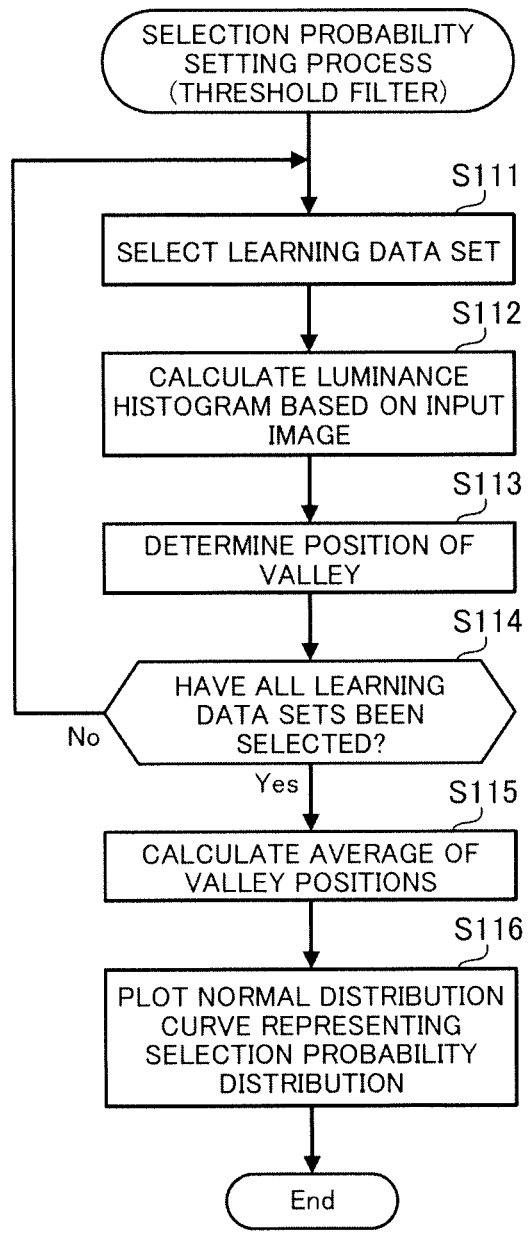
FIG. 16 is a flowchart illustrating an example of a selection probability setting process for parameter values of a threshold filter.

FIG. 16 is a flowchart illustrating an example of a selection probability setting process for parameter values of a threshold filter.

[Step S111] The initial setting unit 121 selects one learning data set (that is, a pair of an input image and a target image) amongst the learning data sets designated in step S21 of FIG. 9.

[Step S112] The initial setting unit 121 calculates a luminance histogram based on luminance values of the input image included in the selected learning data set.

[Step S113] The initial setting unit 121 determines the position of a valley of the luminance histogram.

[Step S114] The initial setting unit 121 determines whether all the learning data sets designated in step S21 of FIG. 9 have been selected. If there is an unselected learning data set, the process returns to step S111. If all the learning data sets have been selected, the process moves to step S115.

[Step S115] The initial setting unit 121 calculates the average of the valley positions determined for the respective input images.

[Step S116] The initial setting unit 121 generates a normal distribution curve with its center at the calculated average, and determines, based on the generated curve, the selection probability corresponding to each parameter value configurable in the threshold filter. The initial setting unit 121 registers, in the record corresponding to the threshold filter within the filter set database 141, each of the determined selection probabilities in association with its corresponding parameter value.

By the processes of FIGS. 15 and 16, the selection probability corresponding to each of the configurable parameter values is determined according to the effectiveness indicating how close the image processing achieved by the threshold filter with the parameter value set therein is to the image processing for converting an input image into a corresponding target image. Herewith, when the threshold filter has been selected as an image filter to be assigned to a node during the process of the learning processing unit 122, a parameter value achieving image processing close to targeted processing is likely to be set in the threshold filter.

Next, the process of setting the selection probabilities for parameter values of a Sobel filter is described with reference to FIG. 17.

For example, by using a Sobel filter with a different configurable parameter value set therein each time, the initial setting unit 121 performs image processing on the input image included in the learning data set. Then, based on respective processed images after the image processing, the initial setting unit 121 calculates the sum of pixel values (for example, luminance values) for each of the processed images. Note here that because Sobel filters are image filters used to detect edges, amounting to a larger sum of pixel values in a processed image means that edges have been detected in more regions. In view of this, when a processed image after the image processing with a Sobel filter contains a larger sum of pixel values, a parameter value set in the Sobel filter to produce the processed image is considered to provide higher effectiveness. Therefore, the initial setting unit 121 assigns a higher selection probability to a parameter value of the Sobel filter, which has produced a processed image containing a larger sum of pixel values.

Note that the process example described above represents the process taking place when only one input image is used. In the case of using a plurality of input images, a process illustrated in FIG. 17 below is performed.

Figure 17:
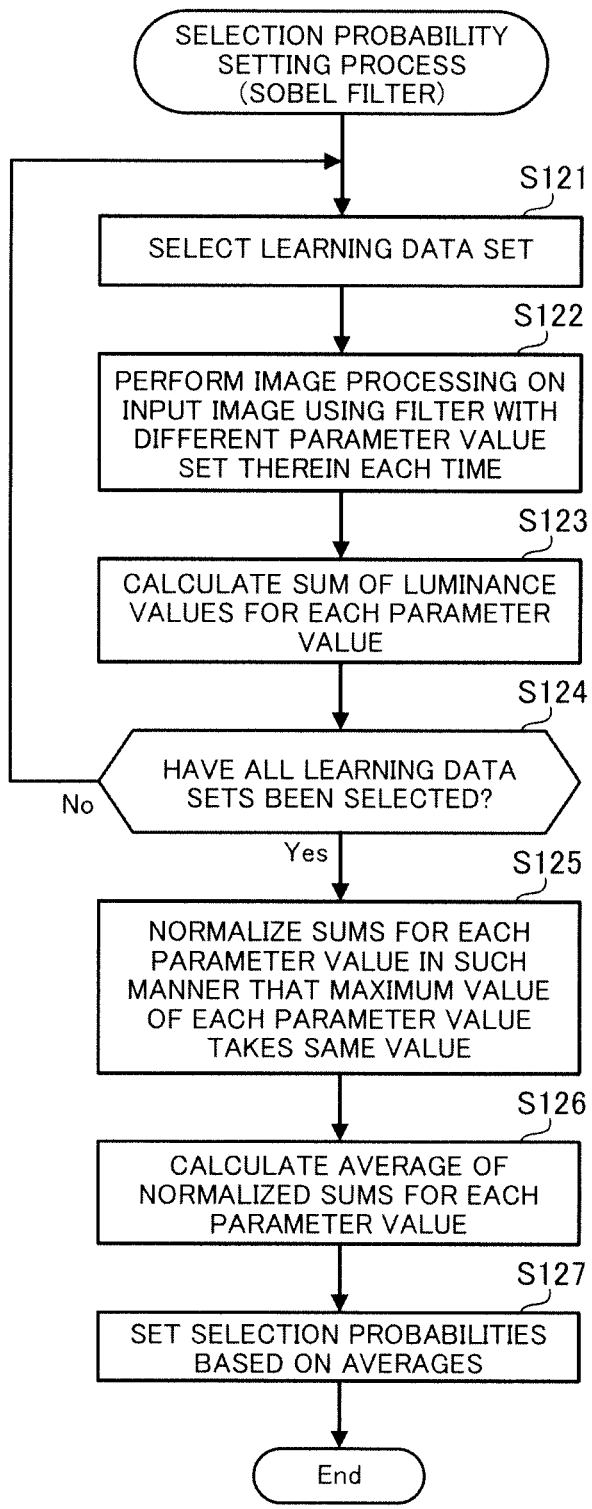
FIG. 17 is a flowchart illustrating an example of a selection probability setting process for parameter values of a Sobel filter.

FIG. 17 is a flowchart illustrating an example of a selection probability setting process for parameter values of a Sobel filter.

[Step S121] The initial setting unit 121 selects one learning data set (that is, a pair of an input image and a target image) amongst the learning data sets designated in step S21 of FIG. 9.

[Step S122] The initial setting unit 121 performs image processing on the input image included in the selected learning data set by using a Sobel filter with a different configurable parameter value set therein each time. Herewith, processed images as many as the number of parameter values are produced.

[Step S123] For each of the processed images, the initial setting unit 121 calculates the sum of luminance values. Herewith, the sum of the luminance values for each of the parameter values is obtained.

[Step S124] The initial setting unit 121 determines whether all the learning data sets designated in step S21 of FIG. 9 have been selected. If there is an unselected learning data set, the process returns to step S121. If all the learning data sets have been selected, the process moves to step S125.

[Step S125] At this point in time, the sums of luminance values as many as the number of learning data sets are obtained for each of the parameter values. The initial setting unit 121 extracts the maximum value from the sums of luminance values for each parameter value. The initial setting unit 121 normalizes the sums of the luminance values calculated for the respective parameter values in such a manner that each of the extracted maximum values takes the same value.

The different input images lead to different maximum values of the sums of luminance values in the images produced after the image processing using the Sobel filter with a different parameter value set therein each time. The normalization operation above makes the differences in the maximum values varying from one input image to another less likely to result in errors.

[Step S126] The initial setting unit 121 calculates the average of the normalized sums for each of the parameter values.

[Step S127] Based on the averages calculated for the respective parameter values, the initial setting unit 121 calculates the selection probability for each of the parameter values. The initial setting unit 121 registers, in the record corresponding to the Sobel filter within the filter set database 141, each of the determined selection probabilities in association with its corresponding parameter value.

For example, the selection probability corresponding to a parameter value is calculated by dividing the average obtained for the parameter value by the total value of the averages obtained for all the parameter values. This assigns a higher selection probability to a parameter value with a larger average value.

By the process of FIG. 17 above, the selection probability corresponding to each of the configurable parameter values is determined according to the effectiveness indicating how effective the image processing achieved by the Sobel filter with the parameter value set therein is to extract edges from an input image. Herewith, when the Sobel filter has been selected as an image filter to be assigned to a node during the process of the learning processing unit 122, a parameter value achieving image processing close to targeted processing is likely to be set in the Sobel filter.

Note that, also as for differential filters other than Sobel filters such as Laplace filters and Prewitt filters, it is possible to determine the selection probability for each of configurable parameter values by the same process as that of FIG. 17 above.

According to the procedures described in FIGS. 11 to 17 above, the selection probability corresponding to the effectiveness derived from the image processing using one or more learning data sets is set for each parameter value configurable in each parameter-variable filter.

As illustrated in FIG. 10, when having selected a parameter-variable filter as an image filter to be assigned to a node of an individual, the learning processing unit 122 selects a parameter value to be set in the parameter-variable filter according to the selection probabilities determined by the above-described procedures. This facilitates a parameter value for achieving image processing close to target processing to be set in the parameter-variable filter. As a result, fitness scores calculated during the image processing program generating process are likely to converge to a high value, which is then likely to reduce the time needed for the program generation.

In addition, even when the number of parameter values configurable in each parameter-variable filter is increased, the above-described technique decreases the possibility of increasing the time needed for the program generation. Therefore, the technique is able to generate, in a short amount of time, an image processing program that achieves high-quality image processing close to targeted processing. Further, an appropriate parameter value is likely to be selected from a larger number of parameter values, which decreases the possibility that parameter-variable filters with not very appropriate parameter values set therein will be connected in multiple stages in the image processing program to be generated. This results in preventing an increase in the number of nodes to be generated in each individual, which also contributes to a reduction in the time for the image processing program generating process.

Next described is a process of determining a parameter value to be set in a parameter undetermined filter. In the following description, a mask filter is used as an example of a parameter undetermined filter. A parameter value to be set is coordinate information indicating a mask region.

Figure 18:
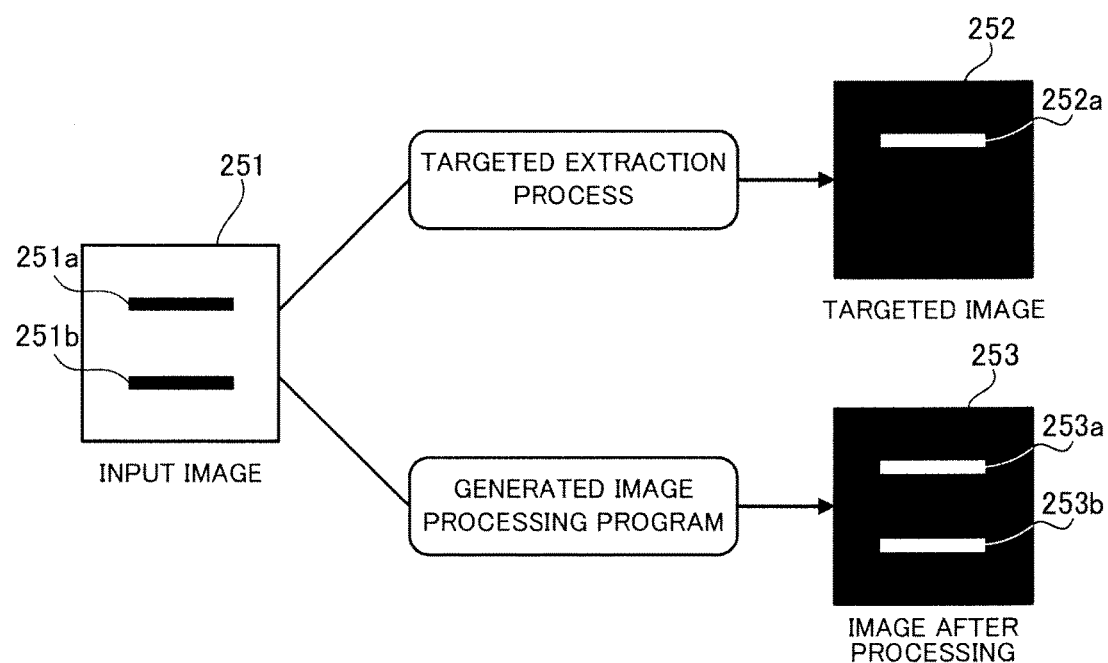
FIG. 18 illustrates an example of a process for extracting a particular region of an input image.

FIG. 18 illustrates an example of a process for extracting a particular region of an input image. Assume that a pair of an input image 251 and a target image 252 of FIG. 18 is provided as a learning data set. The input image 251 includes two characteristic regions 251a and 251b having the same type of characteristic. On the other hand, in the target image 252, only a region 252a corresponding to the characteristic region 251a is extracted and no region corresponding to the characteristic region 251b is extracted. Note that the target image 252 is a binary image, and the pixel value in an extracted region is "1" and the pixel value in the remaining region (i.e., the masked region) is "0".

In this condition, it is relatively easy in program generating processing using genetic programming to generate an image processing program that extracts both the characteristic regions 251a and 252a having the same type of characteristic from the input image 251. In this case, an image 253 after the processing includes a region 253a corresponding to the characteristic region 251a and a region 253b corresponding to the characteristic region 251b. However, it is extremely difficult to generate an image processing program that extracts only one of the characteristic regions 251a and 252a unless the position information of these regions is provided.

In view of the above, according to this embodiment, a program code of a mask filter in which a parameter value is freely configurable is prepared in advance in the filter set database 141. Then, the initial setting unit 121 analyzes the target image included in the learning data set, and determines a parameter value to be set in the mask filter based on the analysis result.

Figure 19:
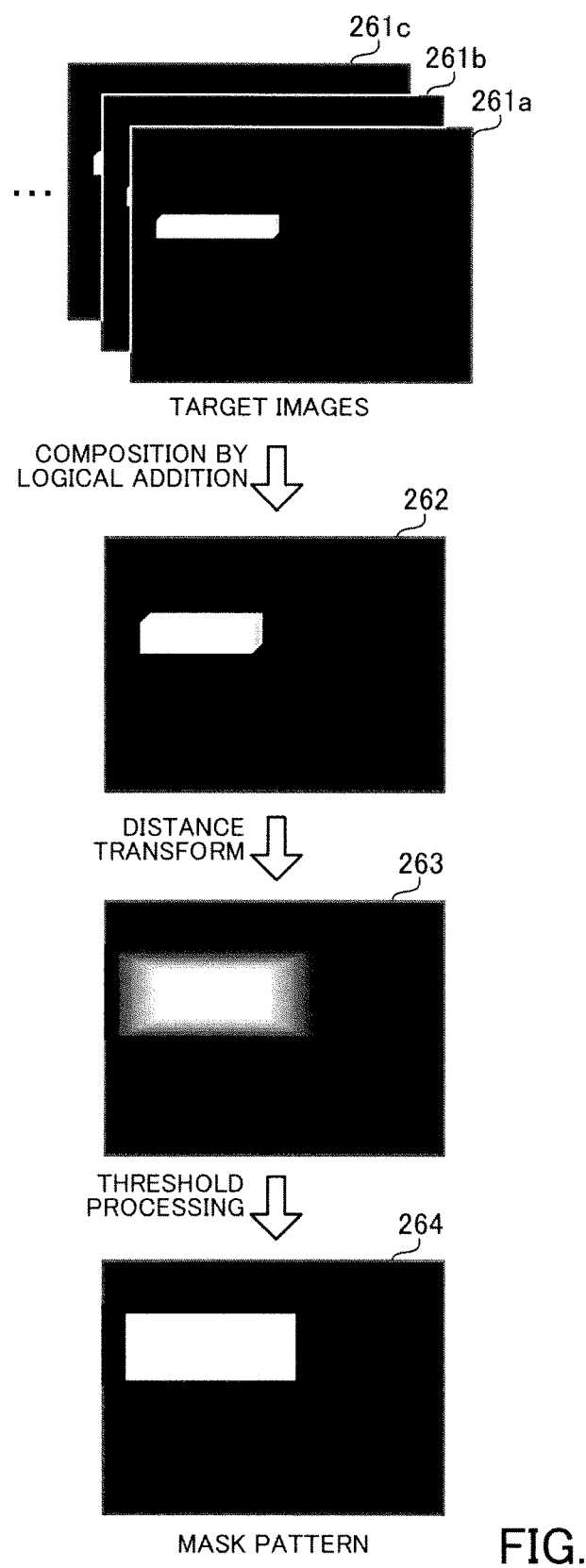
FIG. 19 illustrates an example of a process for determining a mask pattern based on a target image.

FIG. 19 illustrates an example of a process for determining a mask pattern based on a target image.

In the case where there are a plurality of target images, like target images 261a, 261b, 261c, and the like, in FIG. 19, the initial setting unit 121, first, generates a composite image 262 obtained by calculating logical addition of the target images 261a, 261b, 261c, and the like. Then, the initial setting unit 121 applies distance transform to an extraction region (a region with a pixel value of "1") in the composite image 262 to obtain a distance transformed image 263. The distance transform is an operation in which each appropriate pixel is assigned its distance to the nearest pixel having a pixel value anything but "0" as the value of the pixel. Note that, if only one target image is provided, the initial setting unit 121 applies distance transform directly to the target image.

Next, the initial setting unit 121 performs threshold processing on the obtained distance transformed image 263 to thereby generate a mask pattern 264. That is, as for each pixel in the distance transformed image 263, the pixel value (distance) exceeding a predetermined threshold is converted to "1", and the pixel value equal to or below the threshold is converted to "0". The coordinates of a region with "0's" (mask region) in the generated mask pattern 264 are a parameter configurable in the mask filter. Note that, according to the threshold processing above, the mask region is set in such a manner that a predetermined margin is introduced to deal with position shifts of the extraction target region among the input images.

Figure 20:
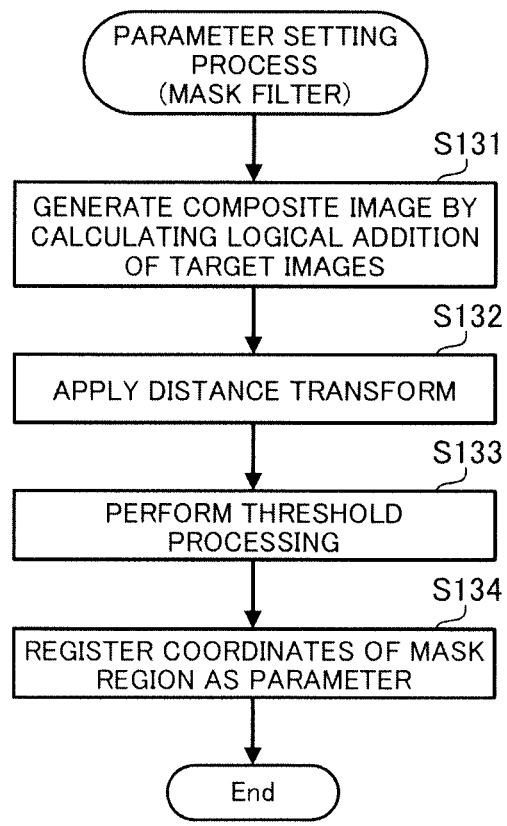
FIG. 20 is a flowchart illustrating an example of a parameter value setting process for a mask filter.

FIG. 20 is a flowchart illustrating an example of a parameter value setting process for a mask filter. The process of FIG. 20 is performed in step S24 of FIG. 9. Assume here that a plurality of learning data sets are designated in step S21 of FIG. 9.

[Step S131] The initial setting unit 121 calculates logical addition of target images included in the respective learning data sets designated in step S21 to generate a composite image.

[Step S132] The initial setting unit 121 applies distance transform to the generated composite image to generate a distance transformed image.

Note that, if only one learning data set is designated in step S21, the initial setting unit 121 applies distance transform directly to the learning data set.

[Step S133] The initial setting unit 121 performs threshold processing on the generated distance transformed image to generate a mask pattern.

[Step S134] The initial setting unit 121 sets the coordinates of a mask region in the generated mask pattern as a parameter of the mask filter. Specifically, the initial setting unit 121 registers, in the record corresponding to the mask filter within the filter set database 141, the coordinates of the mask region as a parameter information piece.

By the processes of FIGS. 19 and 20, the initial setting unit 121 is able to set an accurate parameter in the mask filter for extracting, from input images including a plurality of characteristic regions having the same type of characteristic, regions fewer than the number of the characteristic regions.

3. Embodiment 2-1

The program generating device 10 of the embodiment 1-1 above uses partial programs whose parameter value is configurable afterward (parameter-variable programs). Then, when having selected a parameter-variable program as a partial program to be incorporated into an individual, the program generating device 10 selects one parameter value according to the selection probabilities respectively associated with configurable parameter values, and sets the selected parameter value in the parameter-variable program.

On the other hand, according to a program generating device of an embodiment 2-1, a plurality of partial programs each selectable to be incorporated into an individual are divided into groups. Then, when selecting a partial program to be incorporated into an individual, the program generating device first selects a group, and then selects one partial program from the selected group. In this regard, if a plurality of partial programs are included in the selected group, the program generating device associates the selection probabilities with the respective partial programs. Subsequently, the program generating device selects one of the partial programs included in the group according to the selection probabilities.

Figure 21:
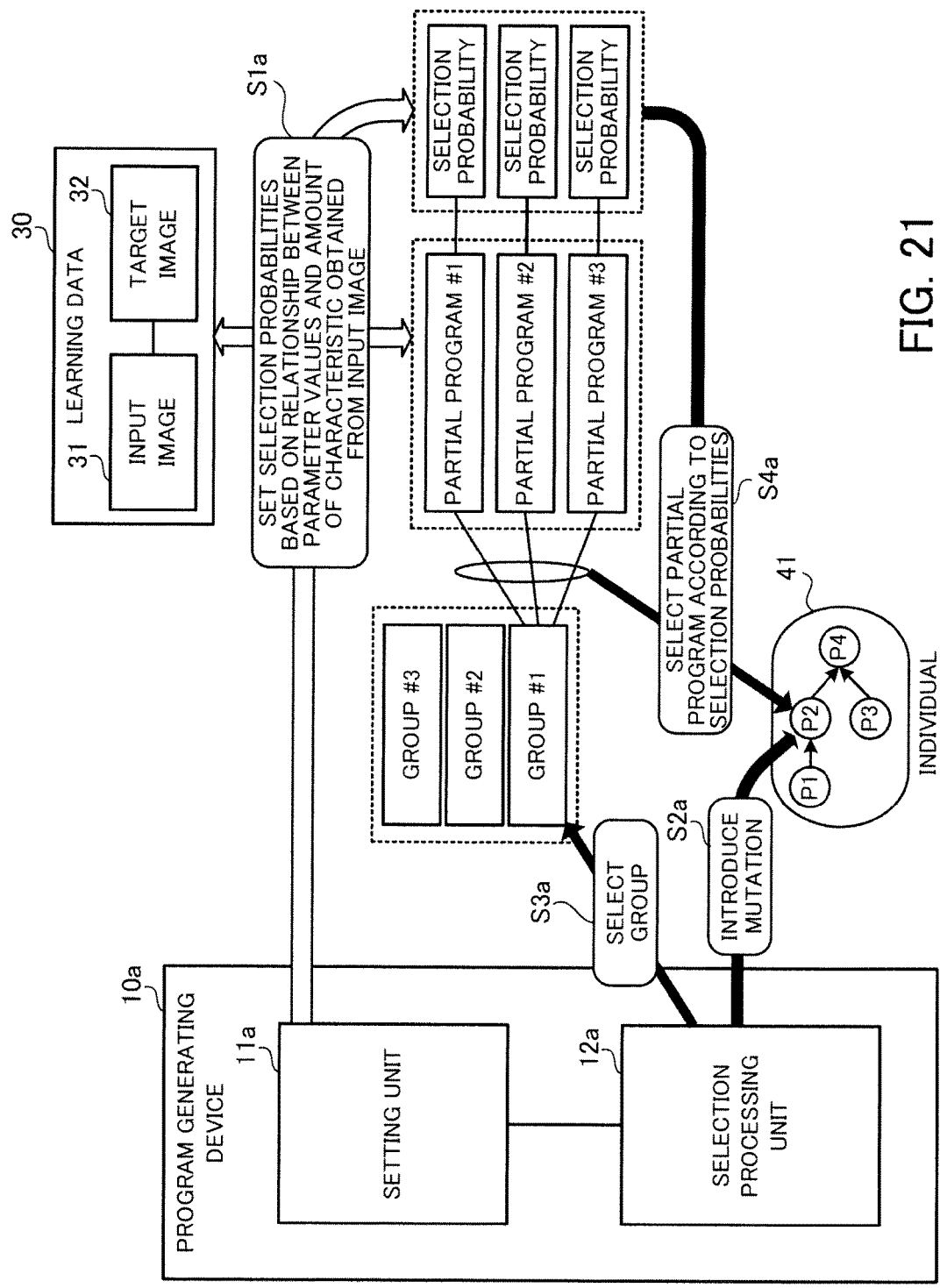
FIG. 21 illustrates configuration and process examples of a program generating device according to an embodiment 2-1.

FIG. 21 illustrates configuration and process examples of the program generating device according to the embodiment 2-1. A program generating device 10a of FIG. 21 generates an image processing program using genetic programming. Note that, in FIG. 21, like reference numerals are given to like components illustrated in FIG. 1, and the description thereof will be omitted.

As described above, a plurality of partial programs available to be incorporated into an individual are divided in advance into a plurality of groups. Each of the groups includes one or more partial programs. According to the example of FIG. 21, a plurality of partial programs available to be incorporated into an individual are divided into groups #1 to #3. The group #1 includes partial programs #1 to #3.

Note here that, for example, partial programs of the same type are included in the same group. Specifically, partial programs of the same type, differing only in their parameter values set therein, may be included in the same group. In addition, partial programs whose associated selection probabilities are calculated by the same method may be included in the same group.

The program generating device 10a includes a setting unit 11a and a selection processing unit 12a. Processes performed by the setting unit 11a and the selection processing unit 12a are implemented, for example, by a processor (not illustrated) of the program generating device 10a executing a predetermined program.

As for a group including a plurality of partial programs, the setting unit 11a sets the selection probabilities respectively associated with the partial programs included in the group. The setting unit 11a determines the selection probability associated with each partial program based on the relationship between the partial program and the amount of characteristic obtained from at least the input image 31 amongst information included in the learning data 30. FIG. 21 illustrates, as an example, the case where the setting unit 11a sets the selection probabilities associated with respective partial programs included in the group #1 (step S1a). Note that the amount of characteristic may be calculated based on the input image 31 and its corresponding target image 32.

According to the setting process of the setting unit 11a, a higher selection probability is set for a partial program when a process implemented by the partial program provides high effectiveness. Providing higher effectiveness means that processing details implemented by the partial program are closer to targeted processing details, and the partial program therefore makes a higher contribution to learning. That is, the partial program providing high effectiveness is incorporated into an individual in the learning process, which raises the possibility of a better fitness score being calculated for the individual. This promotes fitness scores to converge to a high value and thus facilitates the learning.

During the learning process in genetic programming, the selection processing unit 12a first selects a group in a random manner, for example, when selecting a partial program to be assigned to a node of an individual. Then, in the case where the selected group includes a plurality of partial programs, the selection processing unit 12a selects, amongst the partial programs, one partial program according to the selection probabilities respectively associated with the partial programs, and assigns the selected partial program to the appropriate node.

Selecting, amongst partial programs included in a group, one partial program according to the selection probabilities respectively associated with the partial programs makes a partial program estimated to provide higher effectiveness for image processing using the learning data 30 more likely to be incorporated into an individual. This promotes generation of individuals with high fitness scores and therefore facilitates the learning. As a result, the time needed to generate an image processing program is likely to be reduced.

Next, the case is described, as an example, where a mutation is applied to the partial program P2 amongst the partial programs P1 to P4 included in the individual 41 of FIG. 21 (step S2a), to thereby evolve the individual 41.

The selection processing unit 12a selects one group from the groups #1 to #3, for example, in a random manner. Assuming here that the group #1 is selected (step S3a), the selection processing unit 12a selects, amongst the partial programs #1 to #3 included in the group #1, one partial program according to the selection probabilities respectively associated with the partial programs #1 to #3 (step S4a). The selection processing unit 12a incorporates the selected partial program into the individual 41, in place of the partial program P2.

According to the above-described process of the selection processing unit 12a, a partial program estimated to provide higher effectiveness for image processing using the learning data 30 is more likely to be incorporated into an individual. This assists the progress of the learning and therefore raises the possibility of reducing the time needed to generate an image processing program.

Note that, preparing a larger number of partial programs each selectable to be incorporated into an individual raises the possibility of generating a program of high-quality image processing closer to targeted processing; however, it also raises the possibility for the image processing program generating process to take a long time. According to the process of the selection processing unit 12a, even when the number of selectable partial programs is increased, an effective partial program is likely to be selected from them and incorporated into an individual. This reduces the possibility of an increase in the time needed for the program generating process, which in turn raises the possibility of generating a high-quality image processing program in a short amount of time.

Another case where a partial program is assigned to a node of an individual is when, in order to generate an initial individual, a partial program selected from a plurality of partial programs is assigned to each of nodes of the initial individual. In this case also, the selection processing unit 12a is able to select a partial program to be assigned to each node in the same manner as in steps S3a and S4a above. As is the case in introducing a mutation described above, the learning is likely to be facilitated, which is then likely to reduce the time needed to generate an image processing program.

4. Embodiment 2-2

Next described is an image processing device according to an embodiment 2-2. The image processing device of the embodiment 2-2 has the same processing functions as those of the program generating device 10a of FIG. 21 as well as functions for running an image processing program generated by the processing functions to thereby perform image processing.

The image processing device of the embodiment 2-2 is implemented, for example, as a computer with the hardware configuration illustrated in FIG. 5. Hereinafter, the configuration of the image processing device of the embodiment 2-2 is described using the block names and reference numerals of the processing functions illustrated in FIG. 6. The image processing device 100 according to the embodiment 2-2 differs from the image processing device 100 of the embodiment 1-2 in a part of the processing details implemented by the program generating unit 112 and the content of information stored in the filter set storing unit 140. Note that, in the following description, the initial setting unit 121 of the program generating unit 112 is an example of the setting unit 11a of FIG. 21, and the learning processing unit 122 is an example of the selection processing unit 12a of FIG. 21.

Figure 22:
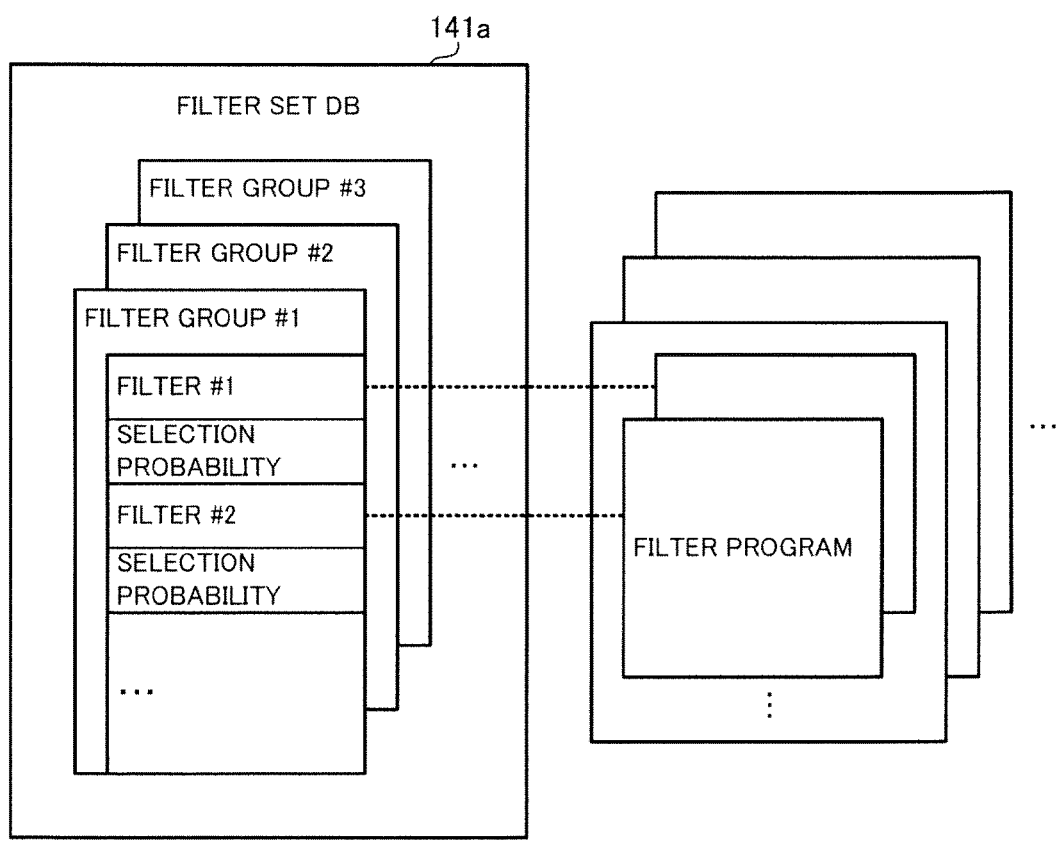
FIG. 22 illustrates an example of information registered in a filter set database according to an embodiment 2-2.

FIG. 22 illustrates an example of information registered in a filter set database according to the embodiment 2-2. A filter set database 141a of FIG. 22 is stored in the filter set storing unit 140 in place of the filter set database 141 of FIG. 7.

In the filter set database 141a, a record is registered for each of filter groups obtained by dividing a plurality of image filters available to be incorporated into an image processing program. Each record has a group identifier (ID) for identifying a corresponding filter group. According to the example of FIG. 22, "filter group #1" indicates a filter group with a group identifier "1".

Each record has one or more identification information pieces each indicating an image filter included in its corresponding filter group. According to the example of FIG. 22, "filter #1" indicates an image filter with a filter identifier "1". One or more identification information pieces of image filters are included in each record. In other words, each filter group includes at least one image filter.

The identification information piece of each image filter registered in each of the records is associated with a different image-filter program code. Note that the associated program codes are stored, for example, in the filter set storing unit 140.

Further, in each record corresponding to a filter group including a plurality of image filters therein, the selection probabilities are registered for the respective identification information pieces of the image filters. Each selection probability indicates the probability that the associated image filter will be selected from its corresponding filter group when the filter group has been selected in the course of selecting an image filter to be assigned to a node in an initial individual or mutation target node. Each time the image processing program generating process is executed, the selection probabilities are set by the initial setting unit 121 in the initial setting operation during the image processing program generating process.

FIG. 23 illustrates an example of grouped image filters. In a classification table 301 of FIG. 23, a "frequency processing group", a "threshold processing group", and a "differential processing group" are illustrated as filter groups.

A single filter group may include, for example, image filters which all perform the same type of image processing but individually have a different parameter value set therein. The threshold processing group of FIG. 23 is an example of such a filter group, and includes a plurality of threshold filters each with a different parameter value set therein. Note that a parameter to be set in a threshold filter is, for example, a threshold.

In addition, each of the frequency processing group and the differential processing group includes a plurality of types of image filters with similar processing details. For example, the frequency processing group includes low-pass and high-pass filters. These image filters have in common that they increase or decrease signal components in a particular spatial frequency range. The frequency processing group may also include a plurality of low-pass filters each with a different parameter value set therein; and a plurality of high-pass filters each with a different parameter value set therein. For the filters belonging to the frequency processing group, the filter size (or kernel size), for example, is used as such a parameter with different setting values.

The differential processing group includes, for example, Sobel, Laplace, and Prewitt filters. These image filters have in common that they perform differential processing. The differential processing group may also include a plurality of Sobel filters each with a different parameter value set therein; a plurality of Laplace filters each with a different parameter value set therein; and a plurality of Prewitt filters each with a different parameter value set therein. For the Sobel and Prewitt filters, for example, the differential degrees in the x and y directions, the filter size, or one of these, is used as such a parameter with different setting values. For the Laplace filters, for example, the filter size is used as such a parameter with different setting values.

As for the frequency processing group and the differential processing group, the selection probabilities respectively associated with image filters included in the same filter group are calculated by the same method. Herewith, it is possible to accurately set, for each image filter, the selection probability associated with its effectiveness derived from image processing using one or more learning data sets. Note that how to calculate the selection probabilities for each filter group is described with reference to FIGS. 27 to 29 below.

Note that parameter undetermined filters, in each of which a parameter value is not set until it is calculated based on one or more learning data sets, are grouped into a dedicated filter group. The procedure for determining a parameter value to be set in a parameter undetermined filter (for example, a mask filter) according to the embodiment 2-2 is the same as that of the embodiment 1-2, and the description is therefore omitted.

Figure 24:
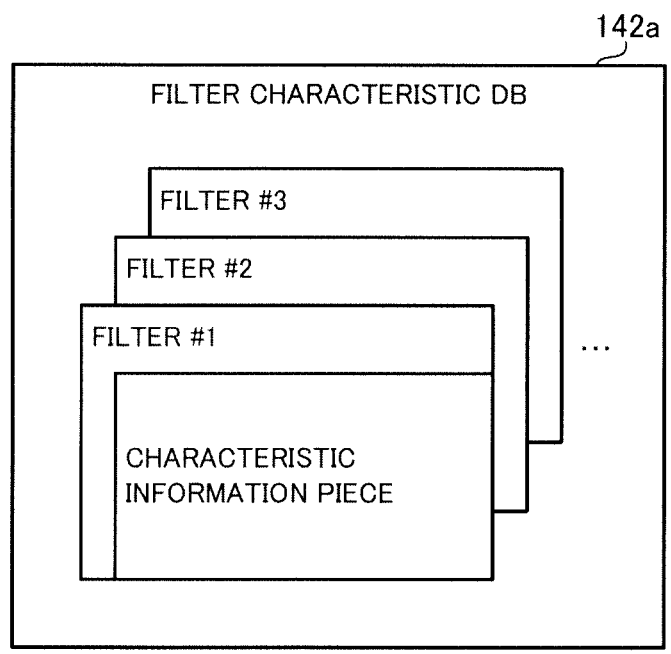
FIG. 24 illustrates an example of information stored in a filter characteristic database according to the embodiment 2-2.

FIG. 24 illustrates an example of information stored in a filter characteristic database according to the embodiment 2-2. A filter characteristic database 142a of FIG. 24 is stored in the filter set storing unit 140, in place of the filter characteristic database 142 of FIG. 8.

As for some filter groups, characteristic information pieces respectively associated with image filters included in one filter group are used to calculate the selection probabilities of the respective image filters. Such characteristic information pieces are registered in the filter characteristic database 142a. The filter characteristic database 142a includes records each corresponding to an image filter. Specifically, in the filter characteristic database 142a, a record is registered for each combination of the type of an image filter and a parameter value set in the image filter. Then, a characteristic information piece of the corresponding image filter is registered in each record. In the case of each image filter included in the frequency processing group, for example, the characteristic information piece indicates frequency characteristics of the image filter (transmittance characteristics to spatial frequencies).

An image processing program generating process according to the embodiment 2-2 is described next using a flowchart.

Figure 25:
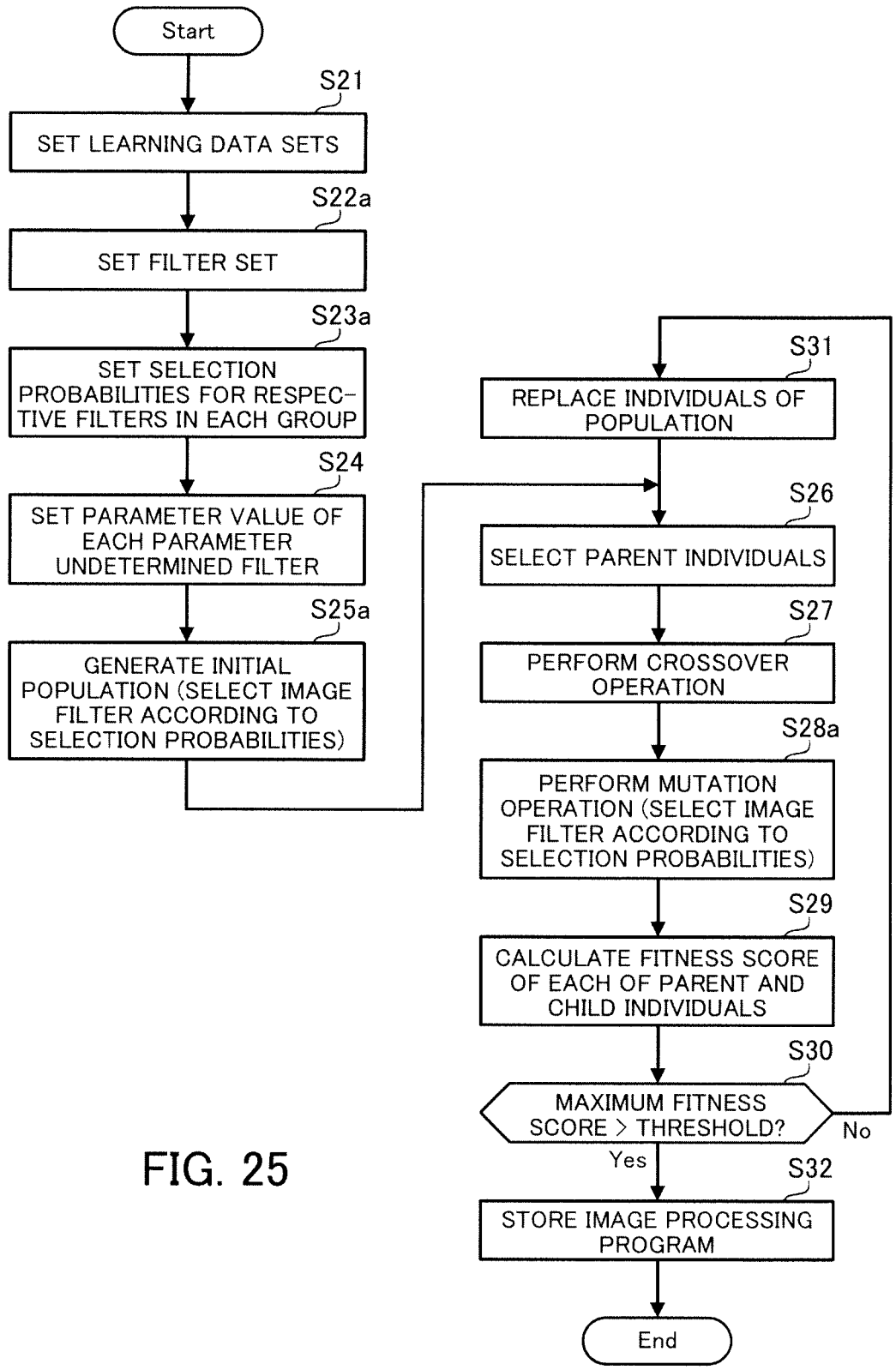
FIG. 25 is a flowchart illustrating an example of an overall procedure of another program generating process.

FIG. 25 is a flowchart illustrating an example of an overall procedure of the image processing program generating process. Note that in FIG. 25, the same step numbers are given to steps with processing details that are common to those of FIG. 9, and the description thereof will be omitted.

The process illustrated in FIG. 25 includes steps S22a, S23a, S25a, and S28a in place of steps S22, S23, S25, and S28, respectively, of FIG. 9.

[Step S22a] The initial setting unit 121 receives an input operation for setting a filter set. For example, filter groups to be used in this image processing program generating process are designated from among the filter groups registered in the filter set database 141.

[Step S23a] As for, amongst the filter groups designated in step S22a, each filter group including a plurality of image filters, the initial setting unit 121 calculates the selection probabilities for the respective image filters and then registers the calculated selection probabilities in the filter set database 141a. Details of this step are described later with reference to FIGS. 27 to 29.

[Step S25a] The learning processing unit 122 generates the population 61 including a predetermined number of initial individuals ("initial population"). When selecting image filters to be assigned to respective nodes of each initial individual, the learning processing unit 122 first randomly selects a filter group from the filter groups designated in step S22a. In this regard, if the selected filter group includes a plurality of image filters, the learning processing unit 122 selects one image filter according to the selection probabilities respectively associated with the image filters. Details of step S25a are described later with reference to FIG. 26.

[Step S28a] The learning processing unit 122 introduces a mutation into a node of one of the generated child individuals to thereby replace an image filter having been assigned to the node with a different image filter included in one of the filter groups designated in step S22a.

The process of selecting the replacing image filter is performed in the following manner. The learning processing unit 122 randomly selects one of the filter groups designated in step S22a. In this regard, if the selected filter group includes a plurality of image filters, the learning processing unit 122 selects one image filter according to the selection probabilities respectively associated with the image filters. Details of the process of selecting the replacing image filter in step S28a are described later with reference to FIG. 25.

Next described are details of the process of selecting an image filter to be assigned to each node of the individuals in step S25a and the process of selecting an image filter newly assigned to the mutation target node in step S28a. In these selecting processes, the learning processing unit 122 performs the procedure illustrated in the following FIG. 26.

Figure 26:
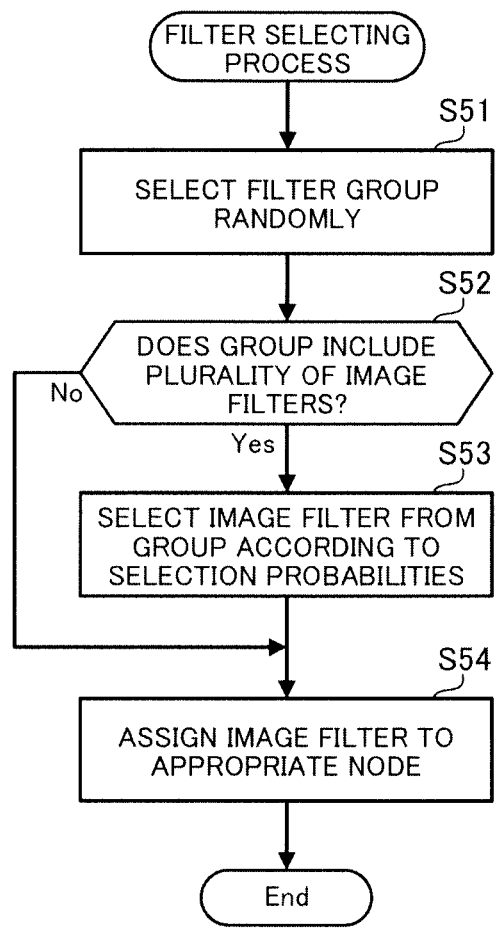
FIG. 26 is a flowchart illustrating an example of another processing procedure for selecting an image filter.

FIG. 26 is a flowchart illustrating an example of a processing procedure for selecting an image filter.

[Step S51] The learning processing unit 122 selects, amongst the filter groups designated in step S22a, a filter group randomly (that is, with an equal probability of being chosen).

Note that, in step S51, the selection probability may be set for each of the designated filter groups in consideration of the number of image filters included in each of the designated filter groups. For example, assume that the filter groups #1 to #3 are designated, and the number of image filters included in the filter groups #1, #2, and #3 is n1, n2, and n3, respectively. In this case, for example, the selection probability of the filter group #1 is obtained by n1/(n1+n2+n3); a selection probability of the filter group #2 is obtained by n2/(n1+n2+n3); and a selection probability of the filter group #3 is obtained by n3/(n1+n2+n3).

[Step S52] The learning processing unit 122 determines whether the filter group selected in step S51 includes a plurality of image filters. If the selected filter group includes a plurality of image filters, the process moves to step S53. On the other hand, if the selected filter group includes only one image filter, the process moves to step S54. In the latter case, the image filter included in the filter group is determined to be selected.

[Step S53] The learning processing unit 122 refers to the record corresponding to the selected filter group within the filter set database 141a, and selects an image filter according to the selection probabilities registered in the record for the respective image filters.

[Step S54] The learning processing unit 122 assigns the selected image filter to an appropriate node.

Next, the selection probability setting process for respective image filters included in a filter group is described with respect to each of the frequency processing group, the threshold processing group, and the differential processing group illustrated in FIG. 23.

Figure 27:
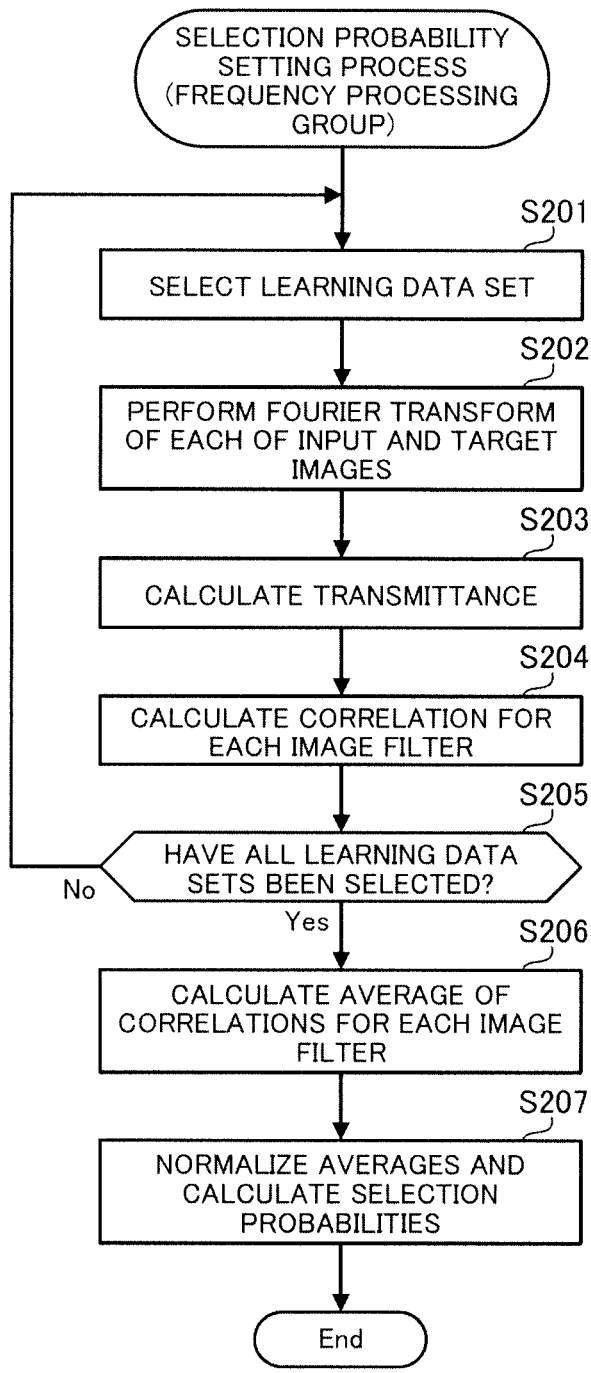
FIG. 27 is a flowchart illustrating an example of a selection probability setting process for respective image filters included in a frequency processing group.

FIG. 27 is a flowchart illustrating an example of a selection probability setting process for respective image filters included in the frequency processing group.

[Step S201] The initial setting unit 121 selects one learning data set (that is, a pair of an input image and a target image) amongst the learning data sets designated in step S21 of FIG. 25.

[Step S202] The initial setting unit 121 performs the Fourier transform of each of the input image and the target image included in the selected learning data set.

[Step S203] Based on respective data sets obtained by the Fourier transform, the initial setting unit 121 calculates the transmittance H(v) using Equation (2) above.

[Step S204] Assume here that the variable "$\sigma$" indicates the serial number of each image filter included in the frequency processing group. Using Equation (3) above, the initial setting unit 121 calculates the correlation coefficient $R(\sigma)$ between the calculated transmittance H(v) and the transmittance L(v, $\sigma$) associated, as a characteristic information piece, with each image filter included in the frequency processing group. The transmittance L(v, $\sigma$) is obtained from each record associated with the frequency processing group, registered in the filter characteristic database 142a.

[Step S205] The initial setting unit 121 determines whether all the learning data sets designated in step S21 of FIG. 25 have been selected. If there is an unselected learning data set, the process returns to step S201. If all the learning data sets have been selected, the process moves to step S206.

[Step S206] With respect to each image filter, the initial setting unit 121 calculates the average Rave($\sigma$) of the correlation coefficients R($\sigma$) calculated based on the different learning data sets in steps S201 to S205. Herewith, the average Rave($\sigma$) is calculated for each image filter.

[Step S207] The initial setting unit 121 normalizes the average Rave($\sigma$) of the correlation coefficients for each image filter to thereby calculate the selection probability of each image filter. The selection probability is calculated by plugging the average Rave(σ) of the correlation coefficients for each image filter in Equation (4), in place of the correlation coefficient R(σ) of each image filter. The initial setting unit 121 registers, in the record corresponding to the frequency processing group within the filter set database 141a, each of the calculated selection probabilities in association with its corresponding image filter.

By the processes of FIG. 27, with respect to each of the image filters included in the frequency processing group, the effectiveness indicating how close the image processing achieved by the image filter is to the image processing for converting an input image into a corresponding target image is calculated as the correlation coefficient, or the average of the correlation coefficients. Then, the selection probability according to the correlation coefficient, or the average of the correlation coefficients, is set for the image filter. Herewith, when the frequency processing group has been selected as the filter group of an image filter to be assigned to a node during the process of the learning processing unit 122, an image filter achieving image processing close to targeted processing is likely to be selected and assigned to the node.

Figure 28:
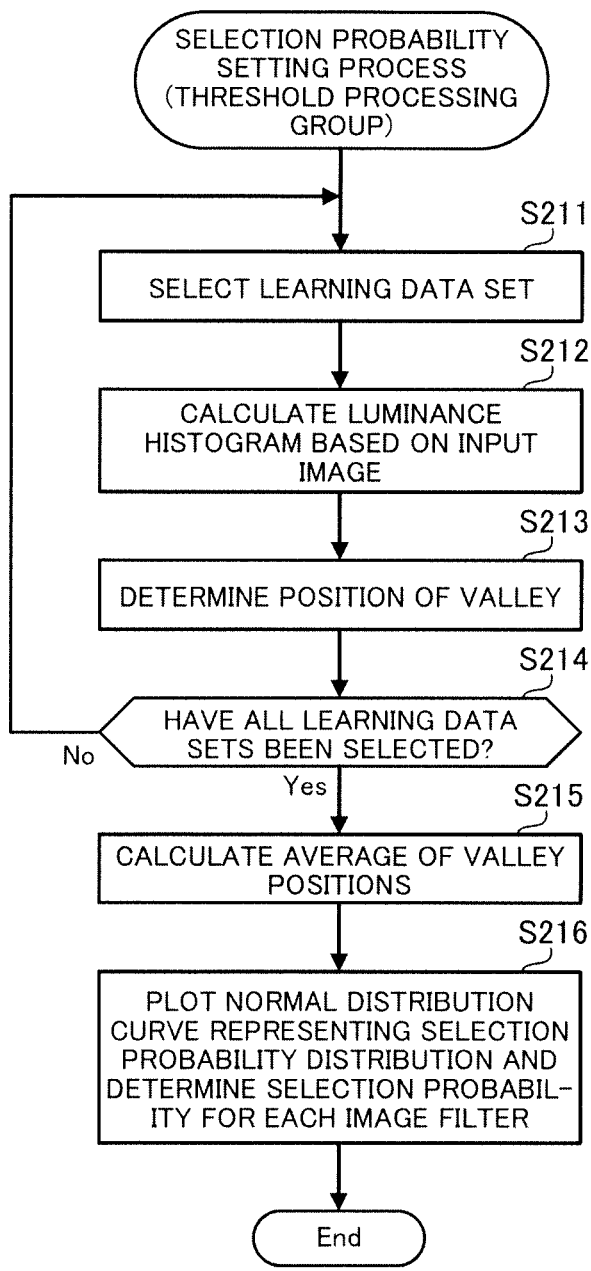
FIG. 28 is a flowchart illustrating an example of a selection probability setting process for respective image filters included in a threshold processing group.

FIG. 28 is a flowchart illustrating an example of a selection probability setting process for respective image filters included in the threshold processing group.

[Step S211] The initial setting unit 121 selects one learning data set (that is, a pair of an input image and a target image) amongst the learning data sets designated in step S21 of FIG. 25.

[Step S212] The initial setting unit 121 calculates a luminance histogram based on luminance values of the input image included in the selected learning data set.

[Step S213] The initial setting unit 121 determines the position of a valley of the luminance histogram.

[Step S214] The initial setting unit 121 determines whether all the learning data sets designated in step S21 of FIG. 25 have been selected. If there is an unselected learning data set, the process returns to step S211. If all the learning data sets have been selected, the process moves to step S215.

[Step S215] The initial setting unit 121 calculates the average of the valley positions determined for the respective input images.

[Step S216] The initial setting unit 121 generates a normal distribution curve with its center at the calculated average. The initial setting unit 121 compares the generated normal distribution curve and the parameter value set in each of the threshold filters included in the threshold processing group to thereby determine the selection probability for the threshold filter. The initial setting unit 121 registers, in the record corresponding to the threshold processing group within the filter set database 141a, each of the determined selection probabilities in association with its corresponding threshold filter.

By the process of FIG. 28, the selection probability corresponding to each of the threshold filters included in the threshold processing group is determined according to the effectiveness indicating how close the image processing achieved by the threshold filter with its corresponding threshold processing parameter set therein is to the image processing for converting an input image into a corresponding target image. Herewith, when the threshold processing group is selected as the filter group of an image filter to be assigned to a node during the process of the learning processing unit 122, a threshold filter achieving image processing close to targeted processing is likely to be selected and assigned to the node.

Figure 29:
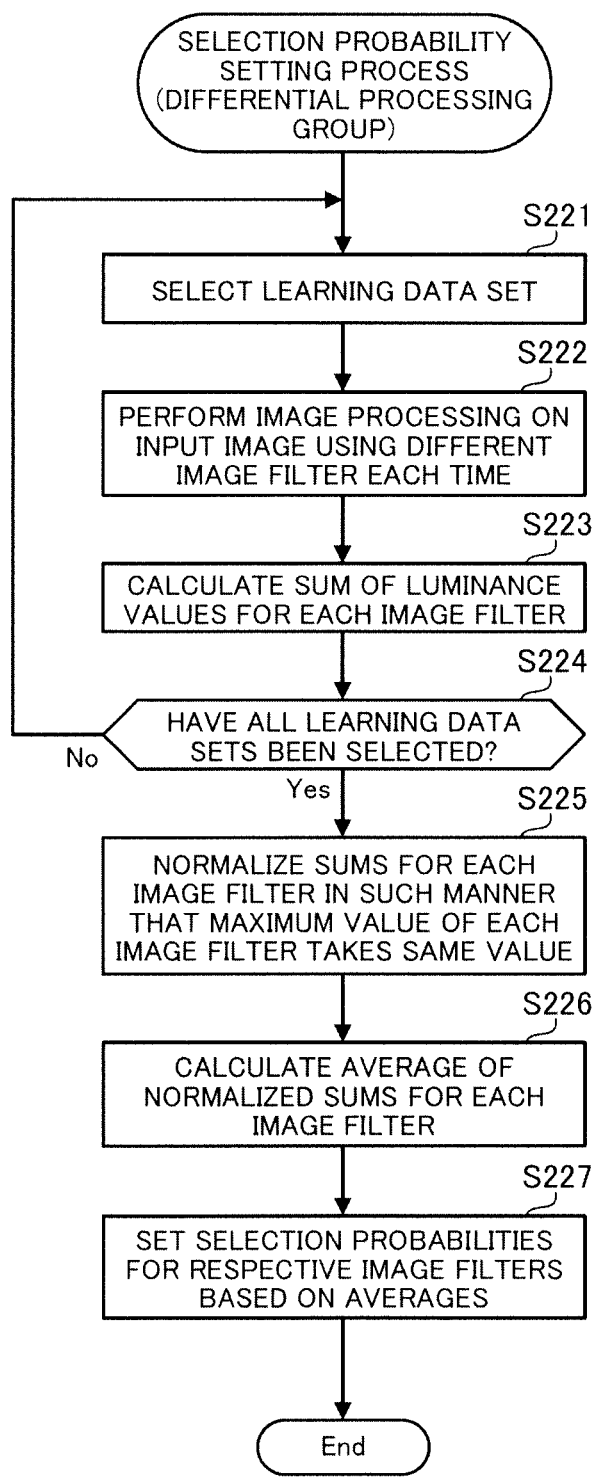
FIG. 29 is a flowchart illustrating an example of a selection probability setting process for respective image filters included in a differential processing group.

FIG. 29 is a flowchart illustrating an example of a selection probability setting process for respective image filters included in the differential processing group.

[Step S221] The initial setting unit 121 selects one learning data set (that is, a pair of an input image and a target image) amongst the learning data sets designated in step S21 of FIG. 25.

[Step S222] The initial setting unit 121 performs image processing on the input image included in the selected learning data set by using a different one of the image filters included in the differential processing group each time. Herewith, processed images as many as the number of the image filters are produced.

[Step S223] For each of the processed images, the initial setting unit 121 calculates the sum of luminance values. Herewith, the sum of the luminance values for each of the image filters is obtained.

[Step S224] The initial setting unit 121 determines whether all the learning data sets designated in step S21 of FIG. 25 have been selected. If there is an unselected learning data set, the process returns to step S221. If all the learning data sets have been selected, the process moves to step S225.

[Step S225] At this point in time, the sums of luminance values as many as the number of learning data sets are obtained for each of the image filters. The initial setting unit 121 extracts the maximum value from the sums of luminance values for each image filter. The initial setting unit 121 normalizes the sums of the luminance values calculated for the respective image filters in such a manner that each of the extracted maximum values takes the same value.

The different input images lead to different maximum values of the sums of luminance values in the images produced after the image processing using a different one of the image filters each time. The normalization operation above makes the differences in the maximum values varying from one input image to another less likely to result in errors.

[Step S226] The initial setting unit 121 calculates the average of the normalized sums for each of the image filters.

[Step S227] Based on the averages calculated for the respective image filters, the initial setting unit 121 calculates the selection probability for each of the image filters. The initial setting unit 121 registers, in the record corresponding to the differential processing group within the filter set database 141a, each of the determined selection probabilities in association with its corresponding image filter.

For example, the selection probability corresponding to an image filter is calculated by dividing the average obtained for the image filter by the total value of the averages obtained for all the image filters of the differential processing group. This assigns a higher selection probability to an image filter with a larger average value.

By the process of FIG. 29 above, the selection probability corresponding to each of the image filters included in the differential processing group is determined according to the effectiveness indicating how effective the image processing achieved by the image filter is to extract edges from an input image. Herewith, when the differential processing group is selected as the filter group of an image filter to be assigned to a node during the process of the learning processing unit 122, an image filter achieving image processing close to targeted processing is likely to be selected and assigned to the node.

According to the procedures described in FIGS. 27 to 29 above, the selection probability corresponding to the effectiveness derived from the image processing using one or more learning data sets is set for each image filter included in each filter group.

As illustrated in FIG. 26, when having selected a filter group including a plurality of image filters as the filter group of an image filter to be assigned to a node in an individual, the learning processing unit 122 selects an image filter from the filter group according to the selection probabilities set for the respective image filters by the above-described procedures. This facilitates selection of an image filter achieving image processing close to targeted processing. As a result, fitness scores calculated during the image processing program generating process are likely to converge to a high value, which is then likely to reduce the time needed for program generation.

In addition, even when the number of image filters included in each filter group is increased, the above-described technique decreases the possibility of increasing the time needed for the program generation. Therefore, the technique is able to generate, in a short amount of time, an image processing program that achieves high-quality image processing close to targeted processing. Further, an appropriate image filter is likely to be selected from a larger number of image filters, which decreases the possibility that not very appropriate image filters will be connected in multiple stages in the image processing program to be generated. This results in preventing an increase in the number of nodes to be generated in each individual, which also contributes to a reduction in the time for the image processing program generating process.

Note that the processing functions of each of the devices described in the embodiments above (the program generating devices 10 and 10a and the image processing device 100) may be achieved by a computer. In this case, a program is provided which describes processing details of the functions to be implemented by each of the devices. By executing the program on the computer, the above-described processing functions are achieved on the computer. The program in which the processing details are described may be recorded on computer-readable storage media. Such computer-readable storage media include a magnetic storage device, an optical disk, a magneto-optical storage medium, and semiconductor memory. Examples of the magnetic storage device are a hard disk drive (HDD), a flexible disk (FD), and a magnetic tape. Examples of the optical disk are a digital versatile disc (DVD), a DVD-RAM, a compact disc-read only memory (CD-ROM), a CD recordable (CD-R), and a CD-rewritable (CD-RW). An example of the magneto-optical storage medium is a magneto-optical disk (MO).

In the case of distributing the program, for example, portable recording media, such as DVDs and CD-ROMs, in which the program is recorded are sold. In addition, the program may be stored in a storage device of a server computer and then transferred from the server computer to another computer via a network.

A computer for executing the program stores the program, which is originally recorded in a portable storage medium or transferred from the server computer, in its own storage device. Subsequently, the computer reads the program from the storage device and performs processing according to the program. Note that the computer is able to read the program directly from the portable storage medium and perform processing according to the program. In addition, the computer is able to sequentially perform processing according to a received program each time such a program is transferred from the server computer connected via a network.

According to one aspect, it is possible to reduce the time needed to generate an image processing program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A program generating method comprising:
setting, by a computer, selection probabilities respectively for a plurality of parameter values selectively configurable in a parameter-variable program amongst a plurality of partial programs, based on a relationship between the parameter values and an amount of characteristic obtained from at least an input image included in learning data which includes the input image and a target image corresponding to the input image, each of the selection probabilities indicating a probability that an associated one of the plurality of parameter values is selected to be set in the parameter-variable program; and
generating, by the computer, an image processing program by determining a combination of partial programs selected from the plurality of partial programs, by genetic programming using the learning data,
wherein the generating includes selecting, amongst the parameter values, one parameter value according to the selection probabilities respectively associated with the parameter values and incorporating the parameter-variable program with the selected parameter value set therein into an individual formed by combining two or more partial programs selected from the plurality of partial programs when having selected the parameter-variable program as a partial program to be newly incorporated into the individual at a target position for a mutation in order to evolve the individual by introducing the mutation,
wherein the setting includes calculating first converted data by converting the input image into data in a frequency domain and second converted data by converting the target image into data in the frequency domain, and delivering information based on the first converted data and the second converted data as the amount of characteristic,
wherein the computer also stores transmittance characteristics, each of which is associated with the parameter-variable program with a different one of the parameter values set therein, and
wherein the setting includes calculating transmittance based on the first converted data and the second converted data as the amount of characteristic, then calculating correlations, each of which measures a relationship between the calculated transmittance and a different one of the stored transmittance characteristics, and setting the selection probability for each of the parameter values based on the calculated correlations.

2. A program generating apparatus comprising:
a memory configured to store learning data including an input image and a target image corresponding to the input image; and
a processor configured to perform a procedure including:

setting selection probabilities respectively for a plurality of parameter values selectively configurable in a parameter-variable program amongst a plurality of partial programs, based on a relationship between the parameter values and an amount of characteristic obtained from at least the input image included in the learning data, each of the selection probabilities indicating a probability that an associated one of the plurality of parameter values is selected to be set in the parameter-variable program; and generating an image processing program by determining a combination of partial programs selected from the plurality of partial programs, by genetic programming using the learning data, wherein the generating includes selecting, amongst the parameter values, one parameter value according to the selection probabilities respectively associated with the parameter values and incorporating the parameter-variable program with the selected parameter value set therein into an individual formed by combining two or more partial programs selected from the plurality of partial programs when having selected the parameter-variable program as a partial program to be newly incorporated into the individual at a target position for a mutation in order to evolve the individual by introducing the mutation, wherein the setting includes calculating first converted data by converting the input image into data in a frequency domain and second converted data by converting the target image into data in the frequency domain, and delivering information based on the first converted data and the second converted data as the amount of characteristic, wherein the memory also stores transmittance characteristics, each of which is associated with the parameter-variable program with a different one of the parameter values set therein, and wherein the setting includes calculating transmittance based on the first converted data and the second converted data as the amount of characteristic, then calculating correlations, each of which measures a relationship between the calculated transmittance and a different one of the stored transmittance characteristics, and setting the selection probability for each of the parameter values based on the calculated correlations.

3. The program generating apparatus according to claim 1, wherein:

the generating includes selecting, amongst the parameter values, one parameter value according to the selection probabilities and incorporating the parameter-variable program with the selected parameter value set therein into an initial individual formed by combining two or more partial programs selected from the plurality of partial programs when having selected the parameter-variable program as a partial program to be incorporated into the initial individual in order to generate the initial individual.

4. The program generating apparatus according to claim 1, wherein:

the setting includes calculating a histogram of data of respective pixels in the input image as the amount of characteristic.

5. The program generating apparatus according to claim 1, wherein:

the setting includes generating a plurality of converted images by performing processing on the input image each time using the parameter-variable program with a different one of the parameter values set therein and delivering information based on the converted images as the amount of characteristic.

6. The program generating apparatus according to claim 1, wherein:

the setting includes setting, based on the target image, a parameter value in a partial program selected amongst the plurality of partial programs except for the parameter-variable program.

7. A non-transitory computer-readable storage medium storing a computer program that causes a computer to perform a procedure comprising:

setting selection probabilities respectively for a plurality of parameter values selectively configurable in a parameter-variable program amongst a plurality of partial programs, based on a relationship between the parameter values and an amount of characteristic obtained from at least an input image included in learning data which includes the input image and a target image corresponding to the input image, each of the selection probabilities indicating a probability that an associated one of the plurality of parameter values is selected to be set in the parameter-variable program; and generating an image processing program by determining a combination of partial programs selected from the plurality of partial programs, by genetic programming using the learning data, wherein the generating includes selecting, amongst the parameter values, one parameter value according to the selection probabilities respectively associated with the parameter values and incorporating the parameter-variable program with the selected parameter value set therein into an individual formed by combining two or more partial programs selected from the plurality of partial programs when having selected the parameter-variable program as a partial program to be newly incorporated into the individual at a target position for a mutation in order to evolve the individual by introducing the mutation, wherein the setting includes calculating first converted data by converting the input image into data in a frequency domain and second converted data by converting the target image into data in the frequency domain, and delivering information based on the first converted data and the second converted data as the amount of characteristic, wherein the computer also stores transmittance characteristics, each of which is associated with the parameter-variable program with a different one of the parameter values set therein, and wherein the setting includes calculating transmittance based on the first converted data and the second converted data as the amount of characteristic, then calculating correlations, each of which measures a relationship between the calculated transmittance and a different one of the stored transmittance characteristics, and setting the selection probability for each of the parameter values based on the calculated correlations.

* * * * *